United States Patent
Imaizumi et al.

(10) Patent No.: US 6,441,915 B1
(45) Date of Patent: Aug. 27, 2002

(54) IMAGE FORMING APPARATUS

(75) Inventors: Shoji Imaizumi, Shinshiro; Yoshihiko Hirota, Toyokawa; Hiroshi Sugiura, Aichi-ken, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/328,589

(22) Filed: Jun. 10, 1999

(30) Foreign Application Priority Data

Jun. 11, 1998 (JP) .......................................... 10-163400

(51) Int. Cl.⁷ .............................................. G06F 15/00
(52) U.S. Cl. ........................................ 358/1.15; 358/1.1
(58) Field of Search ................................ 358/1.1, 1.15, 358/1.9, 296, 540, 449, 456, 518, 523, 538, 519, 461, 462, 298; 347/15, 115, 19, 131, 43, 28

(56) References Cited

U.S. PATENT DOCUMENTS 5,091,734 A * 2/1992 Suzuki et al. .................. 347/15
5,457,518 A   10/1995 Ashikaga et al.
5,767,886 A * 6/1998 Kawakami et al. ......... 347/115

FOREIGN PATENT DOCUMENTS

| JP | 07306624 | 11/1995 |
|----|----------|---------|
| JP | 08286523 | 11/1996 |
| JP | 09234905 | 9/1997  |

* cited by examiner

Primary Examiner—Arthur G. Evans
(74) Attorney, Agent, or Firm—McDermott, Will & Emery

(57) ABSTRACT

A color image is formed by a color printer by superposing images of a plurality of colors formed by a plurality of print units. A discrimination signal which represent character edge is received besides image data. The print positions of the print units are corrected according to image distortion detected by a sensor, and the image data are corrected according to corrected print position data. Further, the discrimination signal of character edge is corrected according to the detected image distortion. A color image is formed based on the corrected image data and the discrimination signal of character edge.

20 Claims, 35 Drawing Sheets

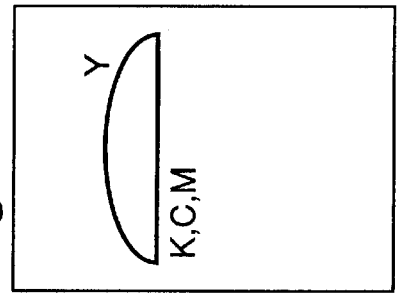
Fig.5A  Shift of subscan drawing position
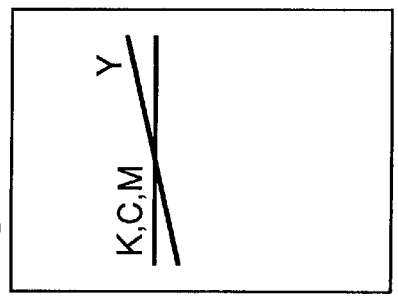
Fig.5B  Skew
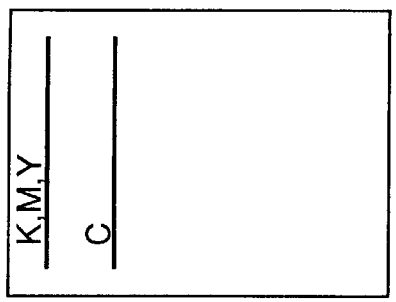
Fig.5C  Bow distortion
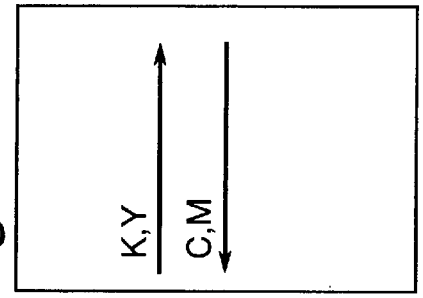
Fig.5D  Distortion of main scan magnification
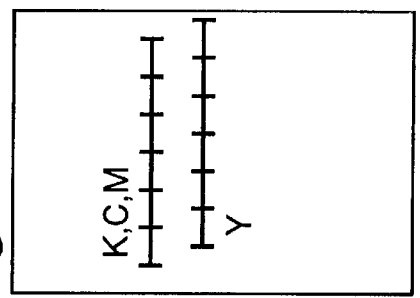
Fig.5E  Shift of main scan drawing position
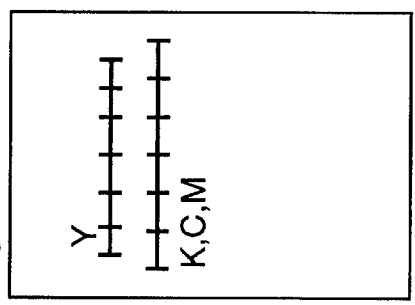
Fig.5F  C,M mirror image

IMAGE FORMING APPARATUS

This application is based on an application No. 10-163400/1998 filed in Japan, the content of which is incorporated hereinto by reference.

BACKGROUND OF THE INVENTION

1. Field of the Invention

The present invention relates to an image forming apparatus which forms a color image by superposing images of a plurality of colors formed by a plurality of print units.

2. Description of Prior Art

In a color image forming apparatus of tandem structure, an image of four colors is formed at the same time in a scan. In the color image forming apparatus, four print units including photoconductors for the four print colors are aligned, and images of the four colors are supplied to exposure positions for each color, by delaying in correspondence to the distances between the photoconductors. In a system wherein four beams are scanned with a polygon mirror, the direction of luster scan becomes reverse to each other between the former two colors and the latter two colors, and the data are corrected therefor. Further, color shifts are caused by various factors.

Print positions for the four colors may be shifted due to image delay by the memories and the shift of exposure positions. Then, color displacement occurs, and image is distorted. When such image distortion is prevented, an image of high quality can be obtained. Then, in order to correct the shift of print positions, it is proposed to detect image distortion quantities and to change the line address in the main scan direction for the colors for an address in the main scan direction according to the detection results.

However, the result of edge decision cannot be corrected when the line address in the main scan direction for the colors for an address in the main scan direction is changed according to the detection results of image distortion. Therefore, noises happen in the image to be outputted.

SUMMARY OF THE INVENTION

An object of the present invention is to provide an image forming apparatus having an image distortion correction system which can perform edge processing more correctly.

In one aspect of the invention, an image forming apparatus includes an image forming unit including a plurality of print units each forming an image of one of a plurality of colors based on image data for one of a plurality of colors. A color image is formed by the print units each forms an image of a color different from each other. An input section receives the image data and discrimination signals of character edge. A detector detects distortion of image, and a first corrector circuit corrects the image data. Further, a second corrector circuit corrects the discrimination signal of character edge according to the image distortion detected by said detector, and a controller controls the image forming unit to form a color image according to the image data corrected by the first corrector circuit and the discrimination signal of character edge corrected by the second corrector circuit.

In another aspect of the invention, in an image processing apparatus, an input section receives image data of a plurality of colors of a color image and attribute discrimination signals which represent image attributes. A detector detects shifts of images of the plurality of colors, and a first corrector circuit changes the image data to correct the shifts of the images of the colors according to the shifts detected by the detector. Further, a second corrector circuit corrects the attribute discrimination signals according to the shifts detected by said detector.

An advantage of the present invention is that an image of higher quality can be formed according to correct edge information.

Another advantage of the present invention is that the edge decision can be corrected with a small-scale circuit by correcting the edge decision in synchronization of image distortion correction in the main scan and subscan directions.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 5A–5F show color shifts caused due to six types of factors;

DETAILED DESCRIPTION OF THE PREFERRED EMBODIMENTS

Figure 1:
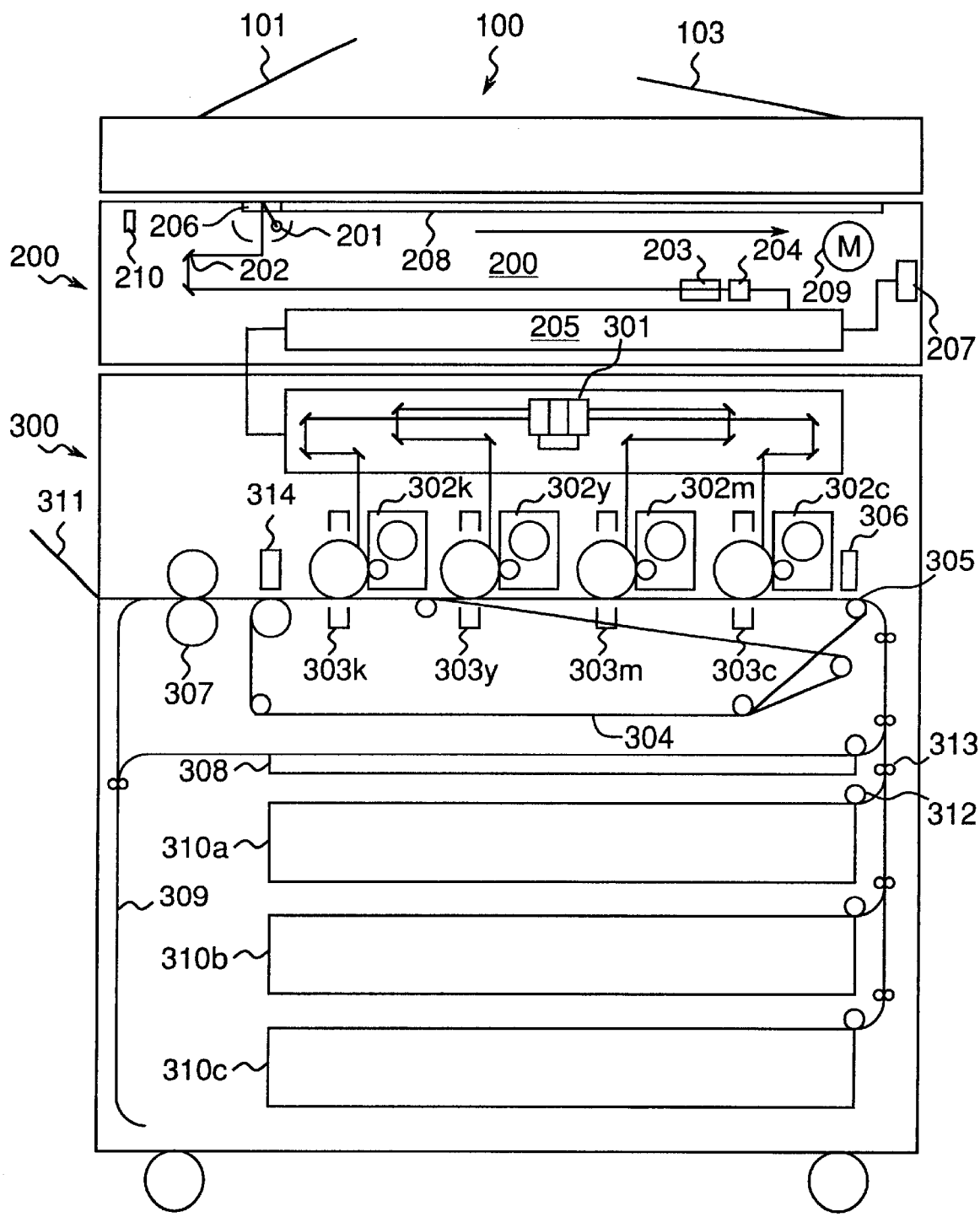
FIG. 1 is a cross sectional view of a color digital copying machine.

Referring now to the drawings, wherein like reference characters designate like or corresponding parts throughout the several views, FIG. 1 shows a whole structure of a color digital copying machine. The copying machine comprises an automatic document feeder 100, an image reader 200 and an image former (printer) 300. Typically, the image reader 200 reads a document which is fed to an image read position by the automatic document feeder 100, and then the read image data is transmitted to the image former 300, whereby an image can be formed (copy function). Also, an interface 207 enables the copying machine to be connected to an external apparatus. Thus, the image data read by the image reader 200 is outputted to the external apparatus (image read function), or conversely the image data received from the external apparatus is sent to the image former 300, whereby the image can be formed (printer function).

Next, the automatic document feeder 100 is described. The automatic document feeder 100 feeds the document set on a tray 101 to the image read position of the image reader 200. After the image read terminates, the document is delivered onto another tray 103.

The document is fed in accordance with a command from an operation panel (not shown). The document is delivered in accordance with a read termination signal from the image reader 200. When a plurality of documents are set, a control signal for these documents is consecutively generated so as to efficiently feed, read and deliver the documents.

The image reader 200 is described. The document on a platen glass plate 208 is illuminated by an exposure lamp 201. A light reflected from the illuminated document is guided by a group 202 of three mirrors to a lens 203 so that the image is formed on a CCD sensor 204. The CCD sensor 204 consists of three line sensors for red, green and blue arranged in parallel to each other, and the main scan direction is along the line sensors. The exposure lamp 201 and the first mirror scan the document at velocity V in accordance with the magnification power in a direction indicated by an arrow by a scanner motor 209, thereby permitting scanning over the document on the platen glass plate 208. The second and third mirrors are moved in the same direction at velocity V/2 with the scanning of the exposure lamp 201 and the first mirror. The position of the exposure lamp 201 is calculated and controlled in accordance with a scanner home sensor 210 and an amount of movement from home position (the number of steps of the motor). The light reflected from the document, which is incident on the CCD sensor 204, is converted to an electric signal in the sensor. An image processing circuit 205 processes the analog electric signal and converts it to digital image data. Then, the digital image is sent to the interface 207 and the image former 300. A white shading correction plate 209 is located at a different position from the image read position of the platen glass plate 208. The shading correction plate 209 is read in order to create correction data for shading correction prior to the read of image information on the document.

Next, the image former 300 is described. First, exposure and imaging is described.

The image data transmitted from the image reader 200 or the interface 207 is converted to print data of cyan (C), magenta (M), yellow (Y) and black (K). The data is sent to controllers (not shown) of exposure heads. Each exposure head controller allows a laser to emit the light in accordance with the electric signal of the transmitted image data. The emitted light is scanned by a polygon mirror 301 in one dimension. Photoconductors in imaging units 302c, 302m, 302y and 302k are exposed to the light. The imaging units 302c, 302m, 302y and 302k are arranged in an array along the paper carrying direction of a belt 304 for carrying a paper. In each of the imaging units, elements required for an electrophotography process are arranged around the photoconductor. The photoconductors for C, M, Y and K rotate clockwise, whereby the processes of image forming are consecutively performed. The imaging units needed for these image forming processes are integrated for each process, and they are detachable from a body. A latent image on the photoconductor in each imaging unit is developed by each color developing unit. A toner image on the photoconductor is transmitted to paper on a paper feeding belt 304 by a transfer chargers 303c, 303m, 303y, 303k located opposite to the photoconductor in the paper feeding belt 304.

Next, paper feeding and fixing is described. A sheet of paper, on which the image is to be transferred, is supplied to a transfer position and the image is formed on the paper in the following sequence. Sheets of paper of various sizes are set in a group of paper cassettes 310a, 310b and 310c. The paper of a desired size is supplied to a feeding path by a paper feeding roller 312 attached to each of the paper feeding cassettes 310a, 310b and 310c. The paper supplied to the feeding path is sent to the paper feeding belt 304 by a pair of feeding rollers 313. A reference mark on the paper feeding belt 304 is detected by a timing sensor 306 so that the paper is timely fed. Three resist correcting sensors 314 are located at the most downstream position of the imaging units, and they are arranged perpendicularly to the paper feeding direction of the belt 304 or along the main scan direction. When a resist pattern on the paper feeding belt 304 is formed, these sensors 314 detect the amounts of horizontal and vertical color shifts of C, M, Y and K images, and a print image controller (PIC) corrects a drawing position and an image distortion, thereby preventing the color shift of the C, M, Y and K images on the paper. The resist sensors 314 are for example CCD sensors or LED sensors. A different type of resist detection sensors may also be used as far as the position of the pattern image is detected correctly. The toner image transferred on the paper is heated, melted and fixed on the paper by a fixing roller pair 307. Then, the paper is discharged to a tray 311.

For a double-sided copy, the paper having the image fixed by the fixing roller pair 307 is reversed by a paper reversing unit 309 in order to form the image on the back side of the paper. The paper is guided by a double side unit 308 and again fed therefrom. The paper feeding belt 304 can be withdrawn from the C, M and Y imaging units in accordance with a behavior of a belt withdrawing roller 305. Thus, the paper feeding belt 304 can be in no contact with the photoconductor. In forming a monochrome image, the C, M and Y imaging units can stop driving. It is therefore possible to reduce the wear of the photoconductor and the processes around the photoconductor.

Figure 2:
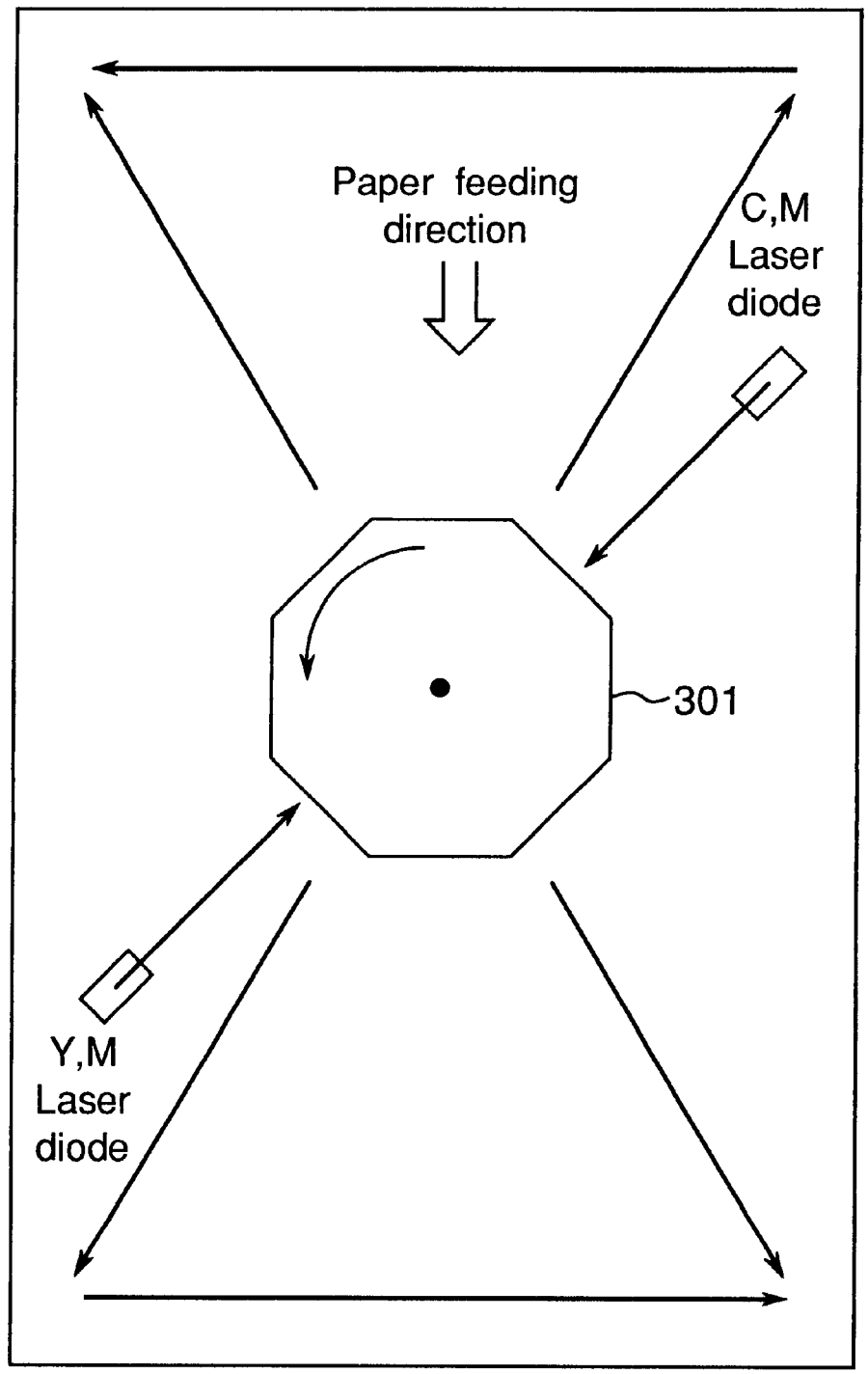
FIG. 2 is a schematic illustration of a constitution of a laser optical system.

FIG. 2 shows a structure of a laser optical system (LD head) including the polygon mirror 301 in top view. Four beams are reflected from the polygon mirror 301. When the photoconductor for each color is exposed to the light, C and M, from the laser, the colors to be painted on the upstream side are thus exposed and scanned in the direction opposite to the direction in which the colors, Y and K, to be painted on the downstream side are exposed and scanned. As described below, the print image controller performs mirror image processing in the direction in which two colors on the upstream side are scanned, thereby solving this problem.

Figure 3A:
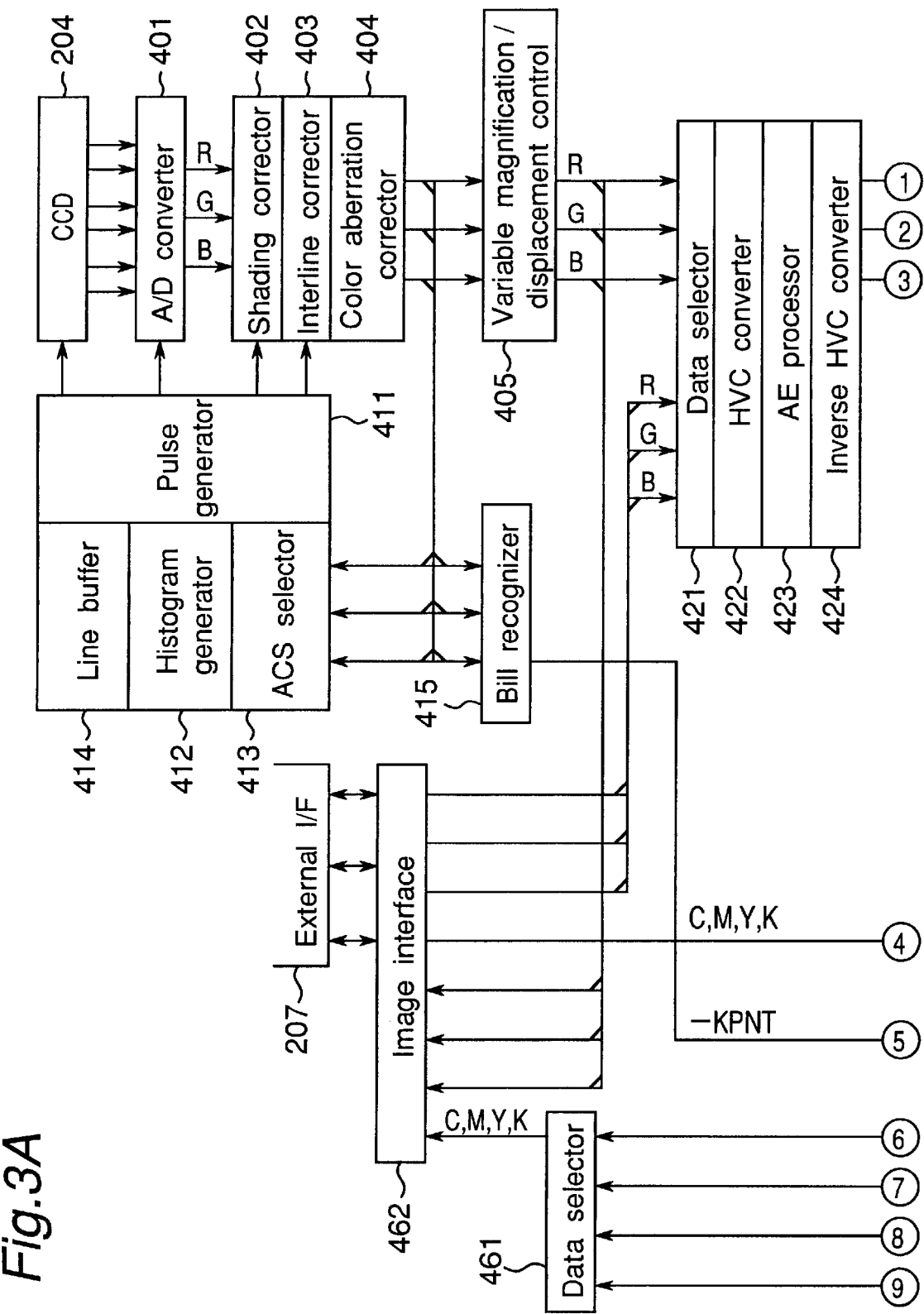
FIGS. 3A and 3B are parts of a block diagram of an image processor.
Figure 3B:
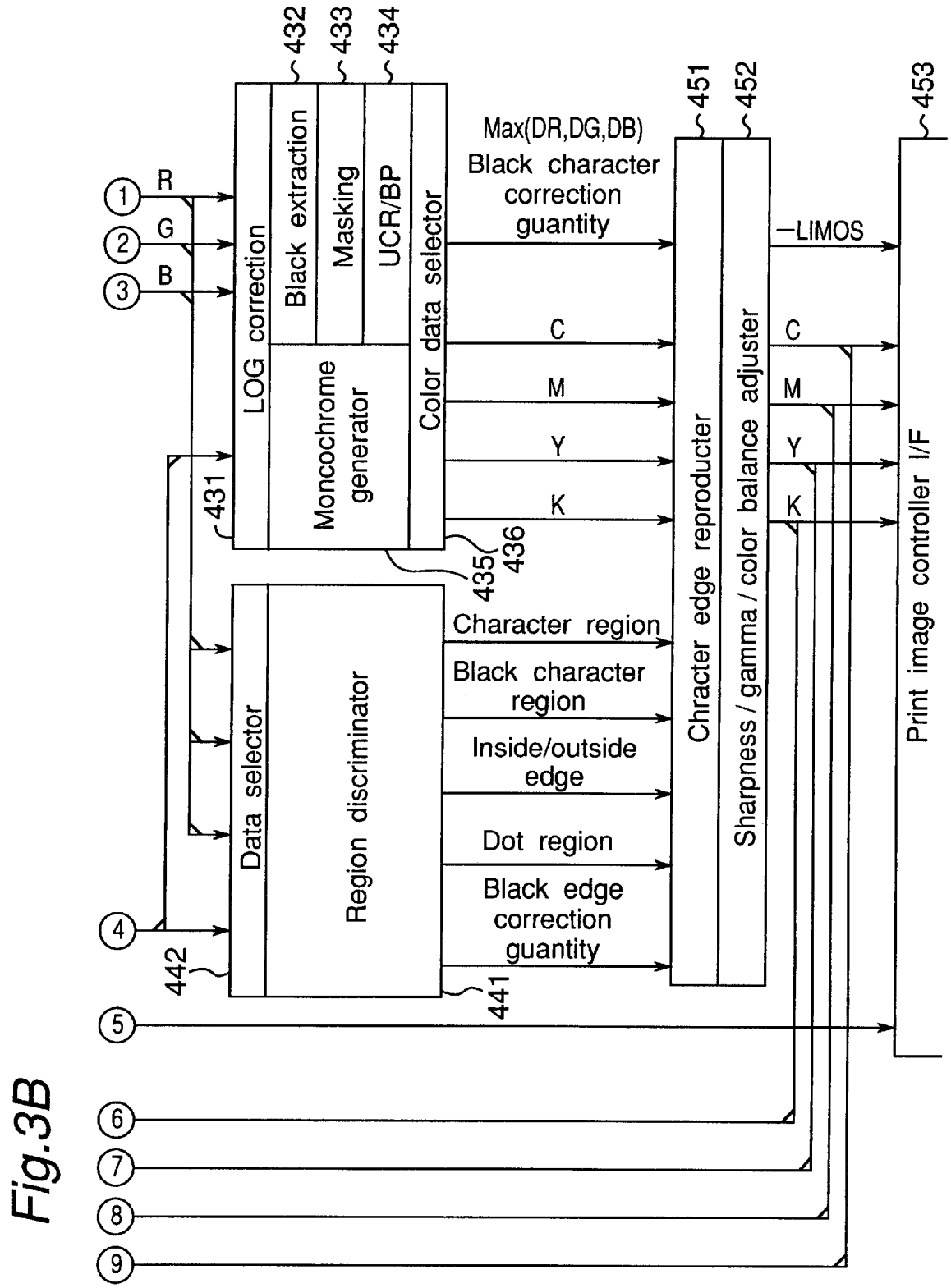

Next, a signal processing by the image reader 200 is described. FIGS. 3A and 3B show a general block diagram of the image processor 205 in the image reader 200. The light reflected from the document surface is formed by a reduction optical system onto an image on the CCD sensor 204, and an analog signal is photoelectrically converted to image data of color information of R, G and B. An A/D converter 401 converts the image data of 400 dpi to 8-bit digital data (256 gradation levels) for each color information of R, G and B by the use of the A/D converter in accordance with a timing signal transmitted from a reference drive pulse generator 411.

In a shading corrector 402, the data obtained by reading the white shading correction plate 209 before reading the document have been stored as reference data in an internal shading memory, independently for each of R, G and B, in order to eliminate a variation in light quantity in the main scan direction in which R, G and B data are scanned in the main scan direction. When the document is scanned, the data is converted to a reciprocal thereof and then multiplied with the read data of the document information, whereby the data is corrected on shading.

In an interline corrector 403, each color data is delayed line by line by the use of an internal field memory in accordance with a scan velocity (depending on the magnification power of subscan). Then, the read positions of the sensor chip for R, G and B are adjusted in the direction in which each sensor chip for R, G and B is scanned.

Due to chroma aberration induced by an optical lens, a phase difference among R, G and B is larger at positions closer to the ends of a document in the main scan direction. This influence causes an error in ACS judgment and black character discrimination to be described below, besides the above-mentioned color shift. Therefore, a chroma aberration corrector 404 corrects the phase difference among R, G and B in accordance with chroma information.

In a variable-magnification/displacement processor 405, two line memories for variable magnification are used for each of the R, G and B data so as to alternately input and output the data line by line, and the write/read timing is independently controlled. Then, the magnification power and displacement in the main scan direction are changed. That is, the reduction is accomplished by thinning the data when the data is written to the memory, while the enlargement is accomplished by increasing a number of the data when the data is read from the memory. Under this control, the interpolation is performed in accordance with the magnification power. For the reduction, the interpolation is performed before the data is written to the memory. For the enlargement, the interpolation is performed after the data is read from the memory. This prevents defects and distortion of the image. Besides the enlargement and the reduction, a combination of the control by this block and the scan control realizes centering of the image, image repeating, consecutive enlargement, reduction in a binding margin, or the like.

In a histogram generator 412 and an automatic color selector (ACS) 413, value data of the document is generated from the R, G and B data obtained by prescan, and the histogram of the value data is created in a memory (histogram memory), before the document is copied. Meanwhile, it is judged in accordance with chroma data whether or not each dot is a color dot, and the number of color dots in each mesh of 512 dots in the document is counted in the memory (ACS memory). Automatic control of copy background level (automatic exposure processing) and automatic color selection (ACS) for judging whether a color copy operation or a monochrome copy operation is selected are performed in accordance with this result.

A line buffer 414 has memories which can store one line of the R, G and B data that are read by the image reader 200. The line buffer 414 monitors the image data for image analysis for automatic sensitivity correction and automatic clamp of the CCD sensor for the A/D converter 401.

In a bill recognizer 415, R, G and B data areas are selected at any time to prevent a normal copy when a security such as a bill (paper money) is put on the platen glass plate 208. It is judged by pattern matching whether or not the document is a bill. As soon as the document is judged as a bill, a central processing unit for controlling the read operation by the image reader 200 and the image processor 205 outputs a black paint signal (−PNT="L") to the print image controller. (The "−" before a reference sign means a signal of negative logic.) The print image controller switches K data to black paint so as to inhibit a normal copy.

An HVC converter 422 temporarily converts the R, G and B data received from a data selector 421 to value (V data) and color difference signals (Cr and Cb data) by a 3*3 matrix operation.

Then, an automatic exposure (AE) processor 423 corrects the V data in accordance with the background level control value and corrects the Cr and Cb data in accordance with chroma level and hue level which are set by the operation panel. Then, an inverse HVC converter 424 reconverts the V, Cr and Cb data to the R, G and B data by an 3*3 inverse matrix operation.

In a color corrector, a logarithm corrector 431 converts the R, G and B data to gradation level data (DR, DG and DB data). Then, a black extractor 432 detects a minimum color level of the DR, DG and DB data as under color component. At the same time, a black extractor 432 detects gradation level difference between maximum and minimum colors of the R, G and B data as document chroma data.

The DR, DG and DB data are subjected to a 3*6 nonlinear matrix operation in a masking operation processor 433. The DR, DG and DB data are converted to the color data (C, M, Y and K data) which match color toners of the printer.

An under color removal/black paint processor (UCR/BP processor) 434 calculates UCR/BP coefficients of the under color component (Min(R, G, B)) in accordance with the document chroma data. The UCR/BP processor 434 determines the amounts of UCR and BP by multiplication. The UCR/BP processor 434 determines a finite difference in the amount of under color removal (UCR) among the C, M and Y data from the C, M and Y data which are subjected to the masking operation. The UCR/BP processor 434 calculates the C, M and Y data and then calculates the BP amount equal to K data. A monochrome data generator 435 creates a value component from the R, G and B data, corrects the data with logarithm operation and outputs the data as black data (DV data). Finally, a color data selector 436 selects the image for color copy, i.e., the C, M, Y and K data or the image for monochrome copy, i.e., the DV data (C, M and Y or white).

A region discriminator 441 detects the difference (Max(R, G, B)−Min(R, G, B)) between the minimum color (Min(R, G, B)) and the maximum color from the R, G and B data inputted to the region discriminator 441 through a data selector 442. Then, a black character, a color character, a dot, and the like are discriminated. Further, by using a Laplacian filter, an edge region is discriminated, and it is discriminated whether the edge region is an inner edge or outer edge. The decision results are transmitted to a character edge reproducer 451. The region discriminator 441 obtains a correction quantity for black character edge when the black character is discriminated and transmits the obtained data also to the character edge reproducer 451. At the same time, it generates and transmits an attribute signal for switching a method of reproducing the gradation level to the print image controller and to a print head controller.

The character edge reproducer 451 performs the correction (edge emphasis, smoothing and character edge removal) suitable for each discriminated region from the C, M, Y and K data received from the color corrector in accordance with the result of the region discrimination. Finally, a sharpness/gamma/color balance adjuster 452 corrects the image of the C, M, Y and K data in accordance with sharpness level, color balance level and gamma level specified with the operation panel. The adjuster 452 transmits a gradation reproduction attribute signal, –LIMOS, to a print image control interface 453. The adjuster 452 sends the C, M, Y and K data through a data selector 461 to an image interface 462.

The gradation reproduction attribute signal, –LIMOS, is explained here. It is transmitted besides the C, M, Y and K data in order to automatically change the gradation reproduction in the print imaging controller and the gradation reproduction period in the print head controller. The signal –LIMOS becomes L level in areas to be subjected to edge processing (dot areas, character edge areas and edge areas inside characters) so as to instruct gradation reproduction processing in preference of resolution in order to reproduce characters without distortion. In the gradation reproduction period in the print head controller, a pseudo-256 gradation processing, so-called multi-level error diffusion, is performed usually. However, in character edge areas with –LIMOS="L", simple quantization is adopted to prevent distortion of characters.

In the print head controller, two-dots pulse width modulation with screen angle of 45 degrees is used usually. However, one-dot pulse width modulation is adopted for areas with –LIMOS="L" in preference of resolution. By changing the processing for inner edges of characters, the gradation reproduction period is changed at the boundaries of character edges by the print head controller. Therefore, density jump (due to difference in gamma characteristic) caused thereby becomes unnoticeable.

Finally, the image interface 462 allows the image to be inputted and outputted to/from an external apparatus. The image interface 462 is operated so that it can simultaneously receive and send the R, G and B data and it can sequentially receive and send the C, M, Y and K data. The external apparatus can use the color copying machine for the scanner function and for the printer function.

Figure 4A:
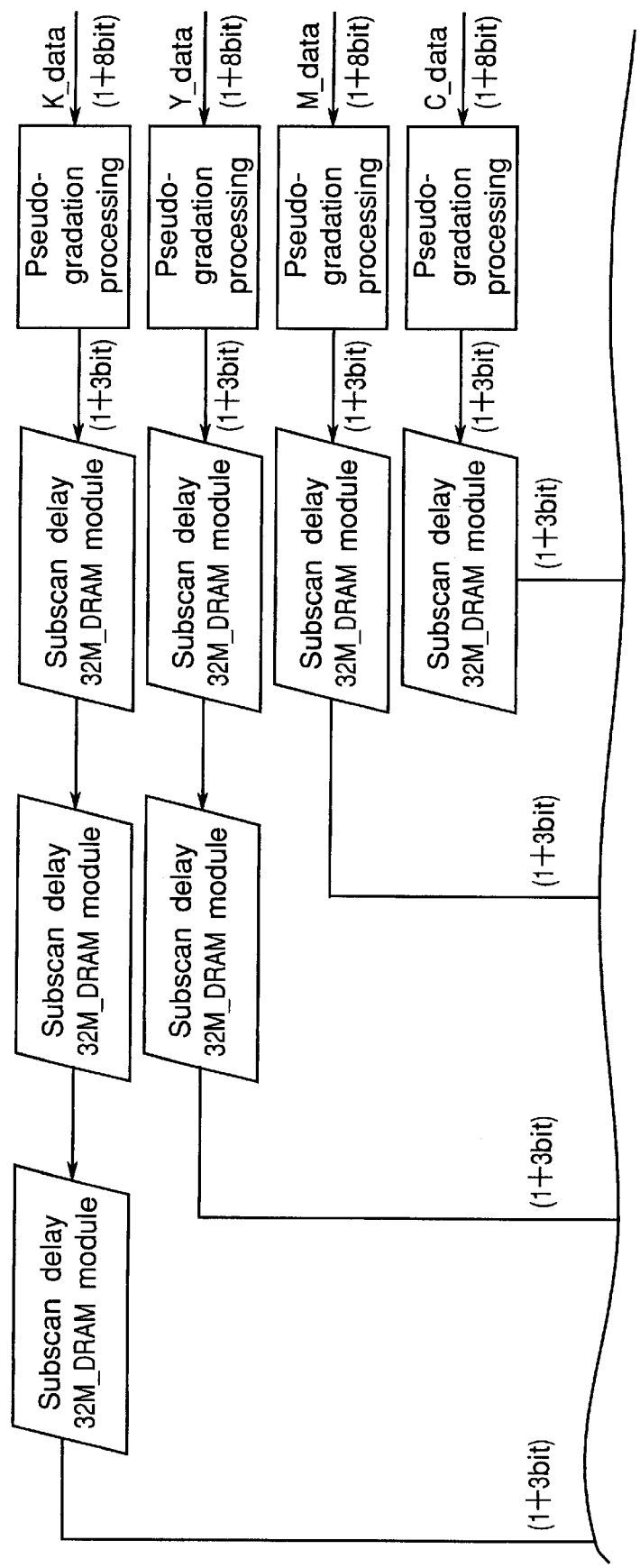
FIGS. 4A and 4B are parts of a diagram on relationship between a system constitution of the copying machine and a print image controller block.
Figure 4B:
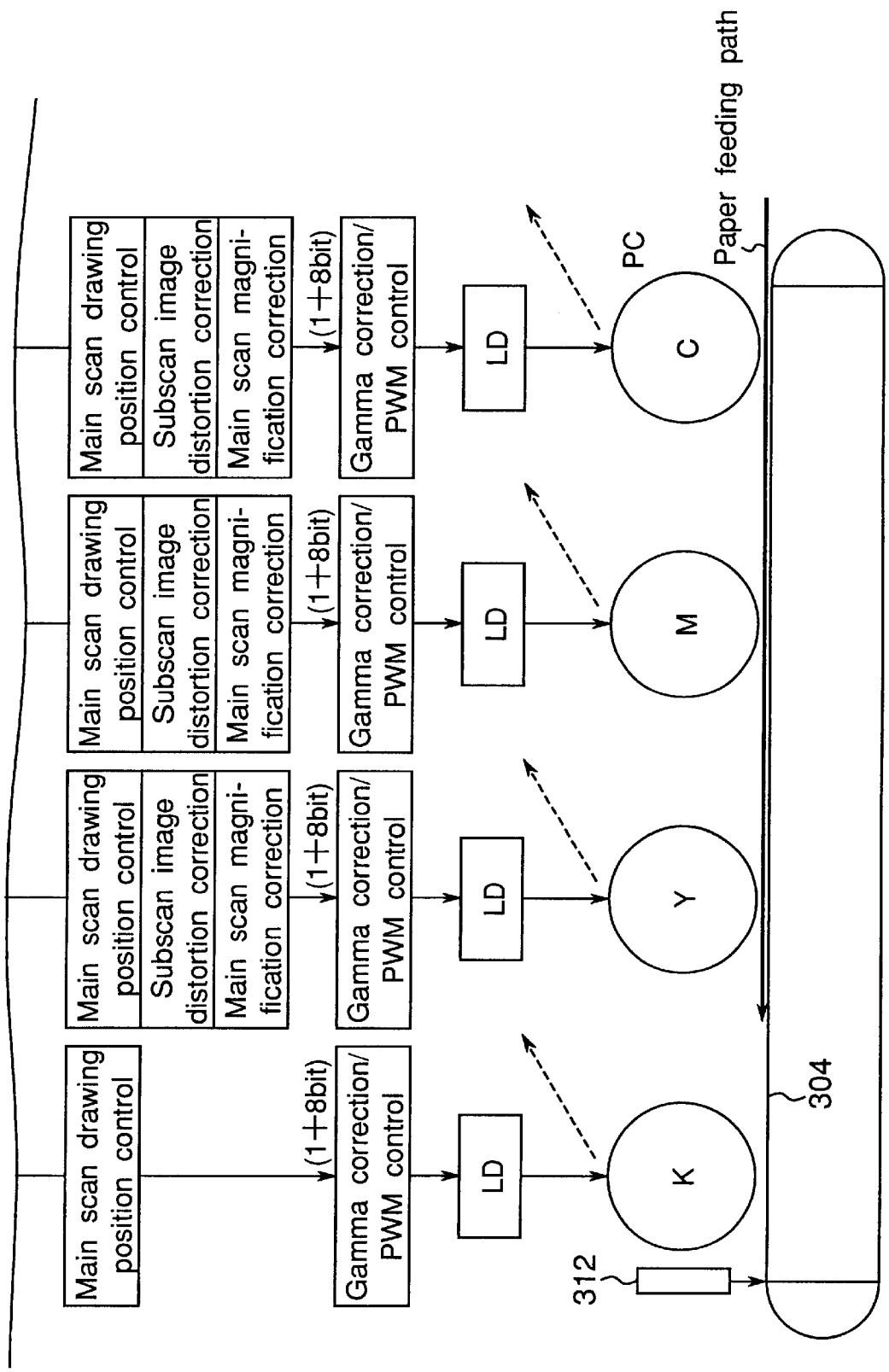

The system explained above is a copying machine for simultaneously outputting four colors per scan, and the imaging units 302c, 302m, 302y and 302k are arranged in an array along the paper feeding direction of the paper-carrying belt 304 (FIG. 1). FIGS. 4A and 4B show relationship between the system structure and the print image controller block. As shown in FIGS. 4A and 4B, the C, M, Y and K data from the image reader 200 are simultaneously transmitted to the print image controller in one scan operation. Accordingly, the processing in the print image controller is basically parallel operation for the C, M and Y data. The system needs to transmit the image composed of C, M, Y and K toner components on the paper fed onto the paper feeding belt 304 without the color shift.

However, as shown schematically in FIGS. 5A–5F, the color shifts happen due to various factors. Because the photoconductors are substantially equally spaced above the paper feeding belt 304, the timings for developing the C, M, Y and K toners are shifted by the times depending on distances between the photoconductors. The timings for C, M, Y and K are therefore controlled by using subscan delay modules so that they are delayed by the amounts depending on the distance between the photoconductors in the subscan direction. However, as shown in FIG. 5A, the colors are deviated when for example C is shifted and drawn in the subscan direction. Moreover, the latent images are formed on the photoconductors with laser scan by using one polygon mirror and four beams. Thus, a raster scan direction of the first two colors (C and M) is opposite to that of the latter two colors (Y and K) and, as a result, the colors are shifted due to this mirror image relationship (FIG. 5F) In addition, for example, the print start positions are displaced in the main scan direction due to the laser scan of the colors (FIG. 5E), the magnification power in the main scan direction is distorted (FIG. 5D), a bow distortion takes place in the subscan direction (FIG. 5C), a skew distortion takes place due to the difference in parallelism between the arrangement of the photoconductors and the laser scan (FIG. 5B), and these factors also cause the color shift. These phenomena are corrected by correcting the position and the images for the C, M, Y and K data, in order to prevent the color shift.

Figure 6:
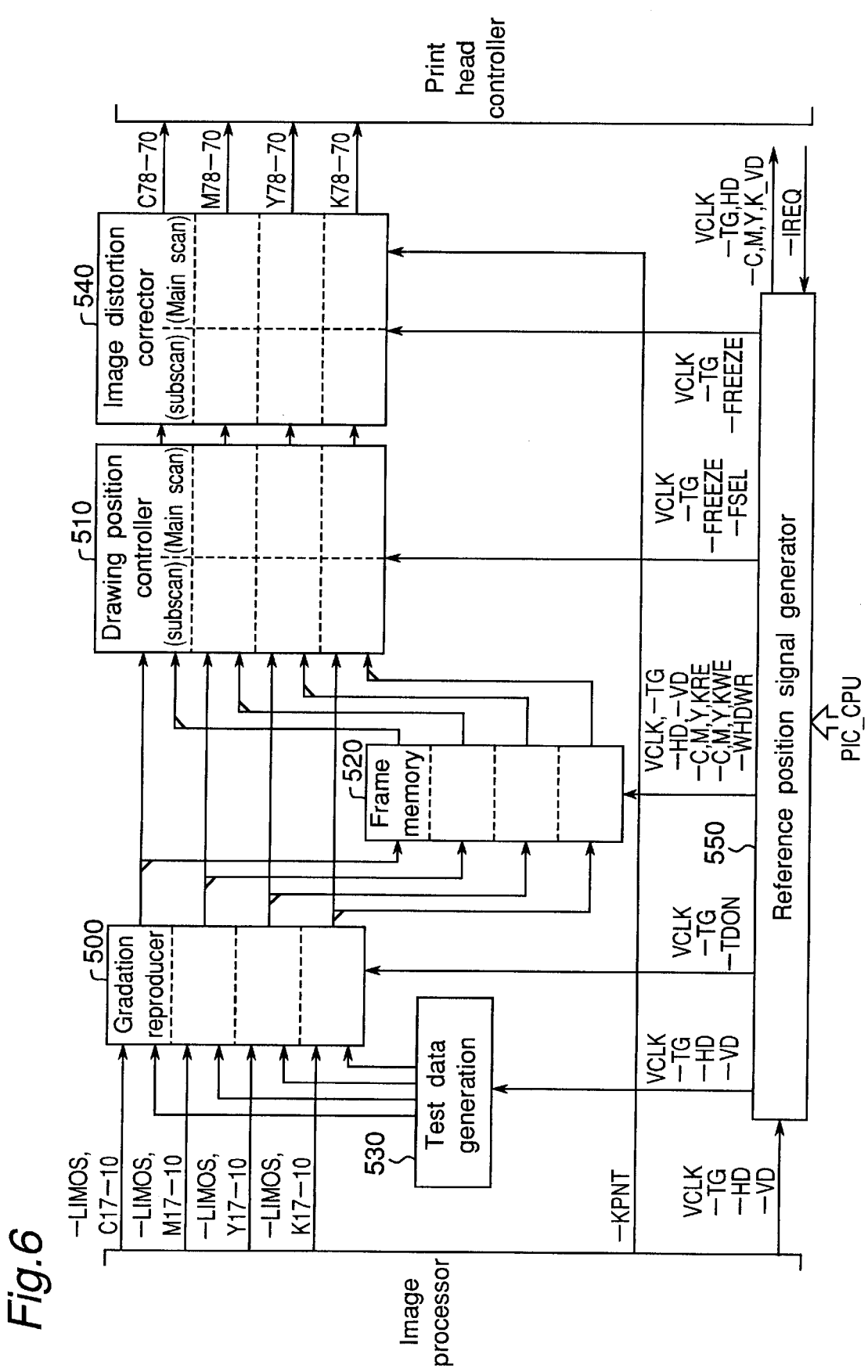
FIG. 6 is a block diagram of the print image controller.

It is the print image controller 500 shown in FIG. 6 that performs these corrections. First, the C, M, Y and K image data transmitted from the image processor 205 are inputted to a gradation reproducer 500. Here, the 8-bit gradation level of the C, M, Y and K data is converted to 3-bit pseudo 256-gradation-level data by a multi-level error diffusion of character separation type in accordance with the –LIMOS signal (gradation reproduction attribute signal). Then, a drawing position controller 510 corrects the position, at which the K component is drawn by the K developing unit located at the most downstream position, on the basis of the paper, in order to correct the shift of the developing timing depending on the distance between the photoconductors (see FIG. 1). The drawing position controller 510 corrects the positions of the other color components for the subscan with respect to the K component. Next, in order to correct the difference in the laser scan direction and the shift of the main scan start position, the C and M images are subjected to main scan mirror image processing. As in the case of the subscan, the position of the K component is corrected on the basis of the paper, while the positions of the other color components are corrected with respect to the K component. A frame memory 520 needs to previously store the image on the front side at the time of a double-sided copy. For this reason, the frame memory 520 has a memory unit whose capacity is equivalent to one surface of A3-size paper, for storing the data from the gradation reproducer 500.

Images of test pattern data of C, M, Y and K for resist detection, which are generated by a test data generator 530, are simultaneously transferred onto the paper carrying belt 304. The amounts of color shift of the C, M and Y components from the K component are detected by a resist detecting sensor 312 which is located in a still more downstream site than the K developing unit located at the most downstream position. An image distortion corrector 540 corrects the main scan magnification distortion, the subscan bow distortion and the skew distortion of the C, M and Y components by means of the interpolation by a gradation level distribution in accordance with the result of the color shift detection, as diagrammatically shown in FIG. 7. The K image data from the drawing position controller 510 is decoded to the 256-gradation-level data. The K image data or black paint data is selected in accordance with the result of the above-described bill recognition. The C, M, Y and K data, which are finally corrected, are shifted to the image position based on the paper by the print imaging controller/ print head controller interface. The C, M, Y and K data are transmitted to the print head controller, and then the image is reproduced. A reference position signal generator 550 generates various reference position signals in accordance with various input signals.

Figure 8:
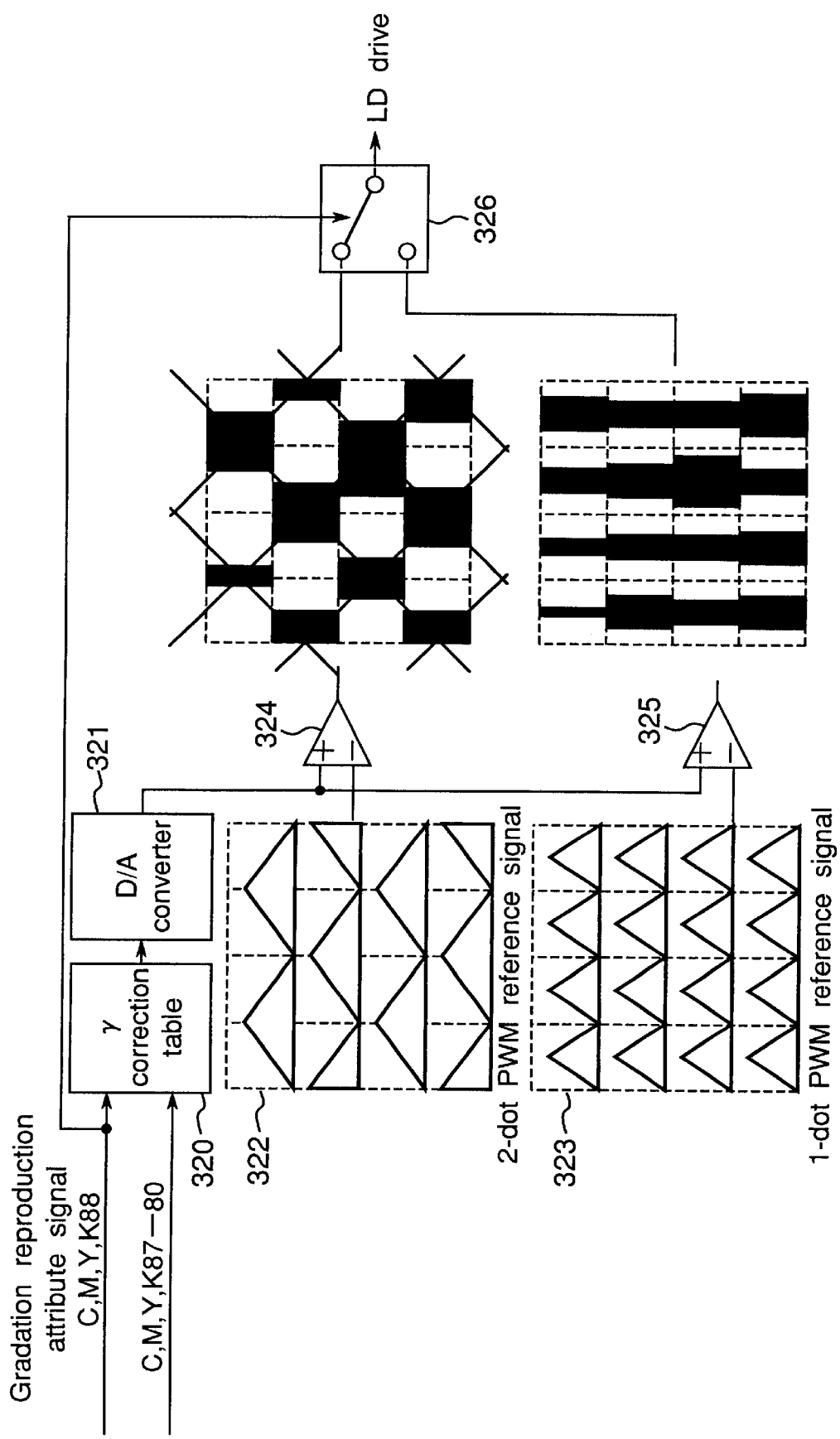
FIG. 8 shows a print head controller.

FIG. 8 shows the print head controller, wherein a gradation level distortion due to gamma-characteristic in the electrophotography process is corrected by a gamma-correction table 320. Then, the gradation level is converted by a D/A converter 321 to an analog level. The most significant bit of each color corresponds to −LIMOS signal (the gradation reproduction attribute signal) transmitted from the image reader. Light modulation method is switched by a switch 326 in accordance with the gradation reproduction attribute signal. When the most significant bit is "L" (=character edge), an LD drive signal is generated by pulse width modulation (PWM) in which a pulse having a cycle of one dot is compared to a reference signal 323 for one dot by a comparator 325. When the most significant bit is "H" (=continuous gradation level), the LD drive signal is generated by pulse width modulation (PWM) in which a pulse having a cycle of two dots is compared to a reference signal 322 for two dots by a comparator 325. By driving a semiconductor laser as explained above, the image is exposed to the light on the photoconductors so as to express the gradation level. For the 2-dot pulse width modulation, a screen angle of 45 degrees is set so that the granular characteristic of the image may be improved. The character edge is reproduced by the 1-dot pulse width modulation which gives priority to resolution and has no defects in characters. For the other regions, the gradation level reproduction is automatically performed. This gradation level reproduction is resistant to an image noise produced by the 2-dot pulse width modulation and the 45-degree screen angle modulation, thus forming the smooth image having excellent granular characteristic.

Next, the print imaging controller is explained (refer to FIG. 6). The 8-bit data, which are obtained by converting the R, G and B data that are read by the image reader 200 into the C, M, Y and K data by means of the image processing, are simultaneously inputted to the gradation reproducer 500. The gradation reproducer 500 receives 8-bit image data of C, M, Y and K and the gradation reproduction attribute signal −LIMOS and converts them to the pseudo 256-gradation-levels by the character separation type multi-value error diffusion. The gradation reproducer 500 outputs each 3-bit color data (gradation level data) and 1-bit gradation reproduction attribute signal. Thus, the 8-bit image data are converted to 3-bit gradation data having a smaller number of gradation levels.

Figure 9:
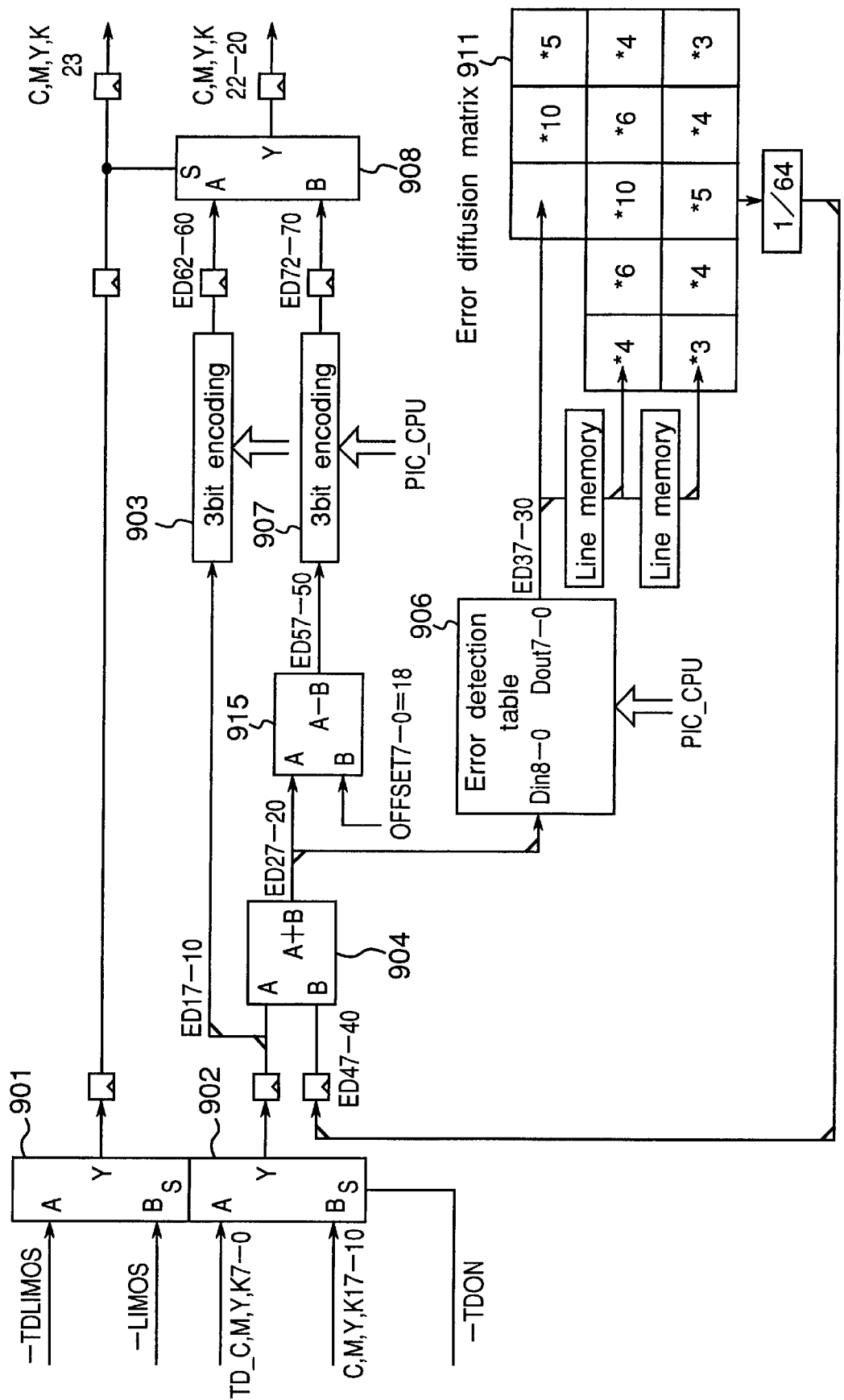
FIG. 9 is a block diagram of a gradation reproducer.
Figure 10:
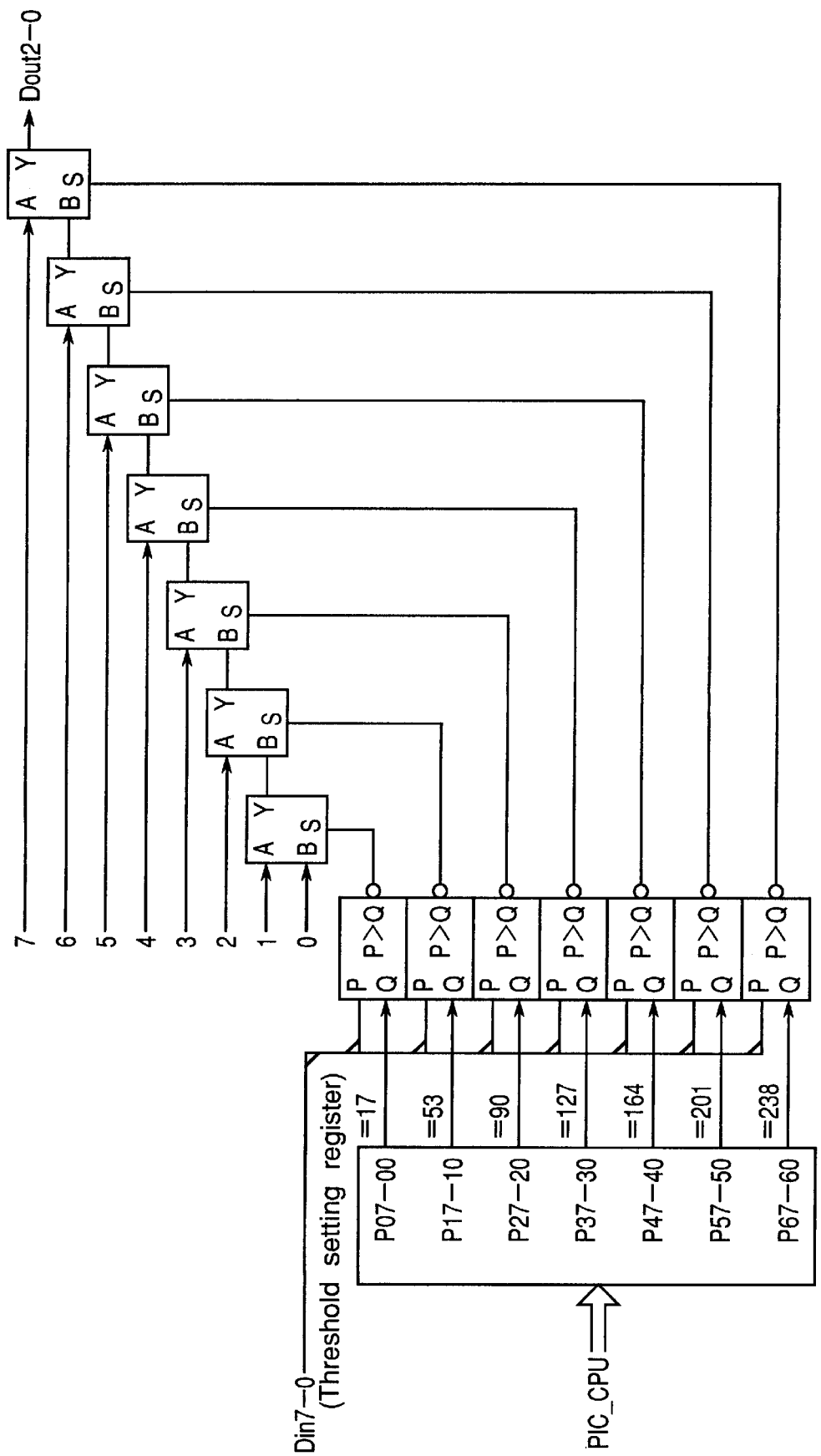
FIG. 10 is a block diagram of a 3-bit encoding.

FIG. 9 is a block diagram of the gradation reproducer 500. Selectors 901 and 902 select test data TD_C, M, Y, K for the resist detection or image data C, M, Y, K from the image reader 200. The selected 8-bit data $ED_{17-10}$ is converted to 8 gradation level data obtained simply by substantially equally dividing 0–255 gradation level range into 7 by a 3-bit encoder 903 (see FIG. 10). That is, the following encoding is performed.

| Input gradation level data | Encoded data |
|---|---|
| 0–17 | 0 |
| 18–53 | 1 |
| 54–90 | 2 |
| 91–127 | 3 |
| 128–164 | 4 |
| 165–200 | 5 |
| 201–238 | 6 |
| 239–255 | 7 |

On the other hand, an adder 904 adds $ED_{17-10}$ to feedback error data $ED_{47-40}$ subjected to error diffusion and outputs $ED_{27-20}$. Then, a subtractor 905 subtracts an offset quantity ($OFFSET_{7-10}$=18) from the data $ED_{27-20}$ obtained by the addition in order to cancel offset error data provided so as not to result a negative error by an error detection table 906, as described below. The contents of the error detection table 906 are as follows. If Din−18≧239, Dout=(Din−18)−255+18. If 238≧Din−18≧202, Dout=(Din−18)−220+18. If 201≧Din−18≧162, Dout=(Din−18)−183+18. If 164≧Din−18≧128, Dout=(Din−18)−146+18. If 127≧Din−18≧91, Dout=(Din−18)−109+18. If 90≧Din−18≧54, Dout=(Din−18)−72+18. If 53 ≧Din−18 ≧17, Dout=(Din−18)−35+18. If 16≧Din−18, Dout=(Din−18)+18. Similarly to the value $ED_{57-50}$ obtained by the subtraction, encoding to 3-bit data is performed by a 3-bit encoder 904 for encoding into 8 gradation level data. A selector 908 selects the image data $ED_{72-70}$ after the error diffusion or the image data $ED_{62-60}$ obtained by simply encoding the input image data into 8 gradation level data, in accordance with the gradation reproduction attribute signal.

According to gradation reproduction attribute signal −LIMOS, the selector 908 selects either of the image data $ED_{72-70}$ subjected to error diffusion and the image data $ED_{62-60}$ converted simply from the input image data as 8-level signals. The gradation reproduction attribute signal −LIMOS indicates the character edge if it is "L" level or indicates the continuous gradation level portion (non-edge) if it is "H" level. That is, a character edge is simply encoded into a 3-bit data of 8 gradation levels, while a non-edge is encoded into a 3-bit data with error diffusion. Thus, a character edge does not have the distortion or texture unique to the error diffusion, while a continuous gradation level portion obtains the smooth gradation level reproduction due to the multi-value error diffusion. The 3-bit C, M, Y and K gradation level data after the gradation level reproduction are transmitted to a following drawing position corrector together with the gradation reproduction attribute signal (3-bit data of each color).

Next, an error feedback route for the error diffusion is described. A sum value $ED_{27-20}$ of the feedback error $ED_{47-40}$ and the input image data $ED_{17-10}$ is inputted to the error detection table 906 in order to determine the error data to be added for the subsequent pixel. First, the error detection table 906 subtracts the offset error quantity (=18) from the value. Then, the table 906 determines the gradation level error in the gradation level range coinciding with a threshold level (=1, 7, 53, 90, 127, 164, 201, 236) in the 3-bit encoder 907. Finally, the table 906 adds the offset value (=18) equivalent to the maximum minus error value so that the error can be integrated with weights at high speed in an error diffusion matrix 911. A series of processing is calculated by means of a lookup table, to output error data $ED_{37-30}$. The contents of the table are downloaded by a central processing unit in the print imaging controller. The contents can be changed in connection with the threshold level of the 3-bit encoding and the gradation level of a gradation level decoder described below. In this embodiment, the error diffusion is accomplished by equally dividing the 0–255 gradation level range into seven. However, the following processing can be also performed. For example, if priority is given to the highlight gradation level, the threshold levels in the 3-bit encoding are set to values more towards to zero. In accordance with this setting, the gradation level of the gradation level decoder and the gradation level difference in the error detection table are set by the central processing unit in the print imaging controller to download them. Then, this can realize very flexible gradation level reproduction. This approach permits calculation of a series of processing in the table at high speed.

The output error data $ED_{37-30}$ are subjected to integration with error weights near an objective pixel by the error diffusion matrix 911 by the use of line memories 909 and 910. The feedback error data $ED_{47-40}$ of the subsequent image data is outputted. At an stage in which the data is outputted from the error detection table 906, the error data is offset so that the maximum minus error value (=18) may be canceled and the error value may be set to zero. Thus, the error diffusion matrix does not need an operation on negative values (or only simple adder circuits are needed). Consequently, the circuit operation is at high speed and its scale can be small.

An error feedback system must be operated at high speed for the following reason. When a transmission rate of the input C, M, Y, K image data is fast, it is necessary to perform error diffusion operation before the subsequent pixel data enters to the system.

As explained above, after the multi-level error diffusion, image delay is performed as explained below in order to correct displacement of drawing positions. It is advantageous that because the image delay is performed after the multi-level error diffusion, the memory capacity of delay memories can be decreased. It is also advantageous that finer correction becomes possible by performing bow correction after the data after the multi-level error diffusion are returned to data of the original number of gradation levels. If the multi-level error diffusion is performed after the bow correction, the screen angle of gradation reproduction may be shifted to cause Moire patterns of the image. However, such a problem does not happen by performing the bow correction after the multi-level error diffusion.

The drawing position controller 510 in the print imaging controller has the following two functions.

(1) The image is stored in a memory for the time delays caused due to the positions of the photoconductors located along the subscan direction. The image is delayed and outputted.

(2) In the control of the main scan position, a start position of the drawing in the main scan direction is controlled, in order to correct a setting error of the print head of a position in the main scan direction, and the mirror image phenomenon of the C and M data due to the structure of the print head is corrected.

Figure 11A:
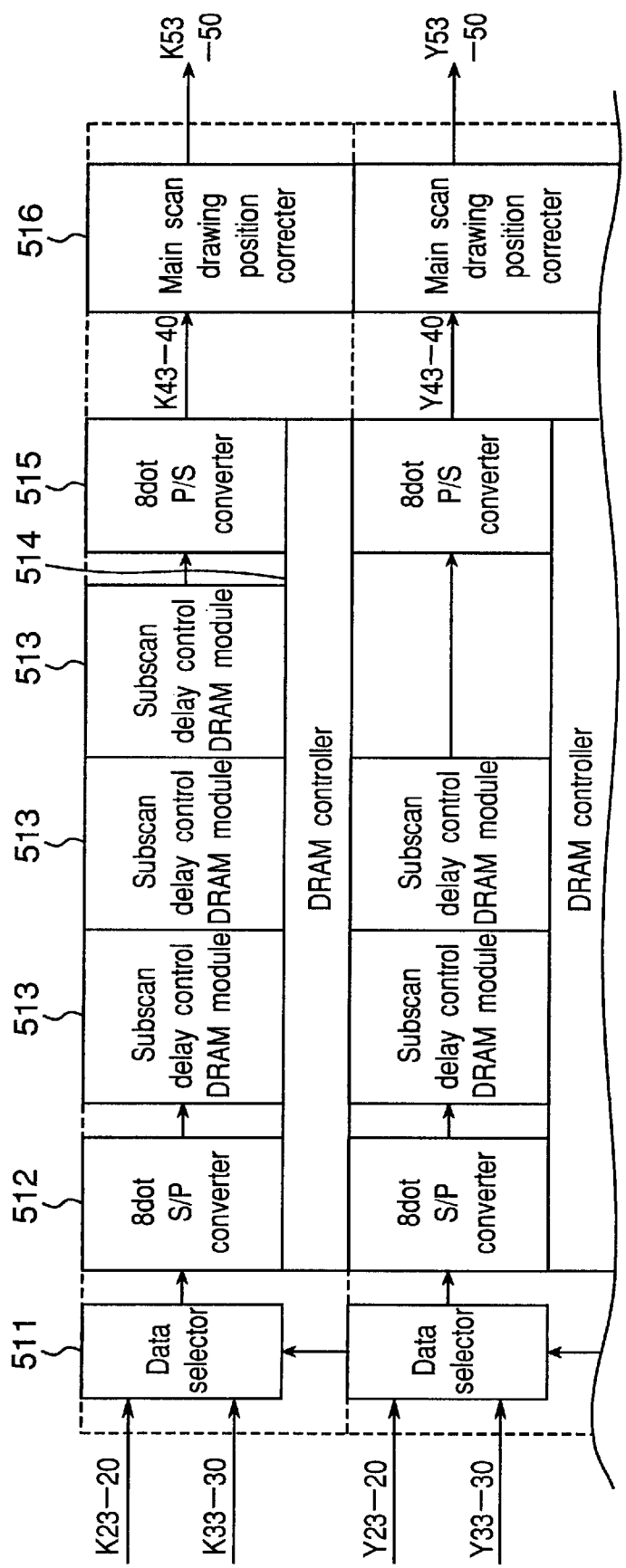
FIGS. 11A and 11B are parts of a block diagram of a subscan drawing position controller.
Figure 11B:
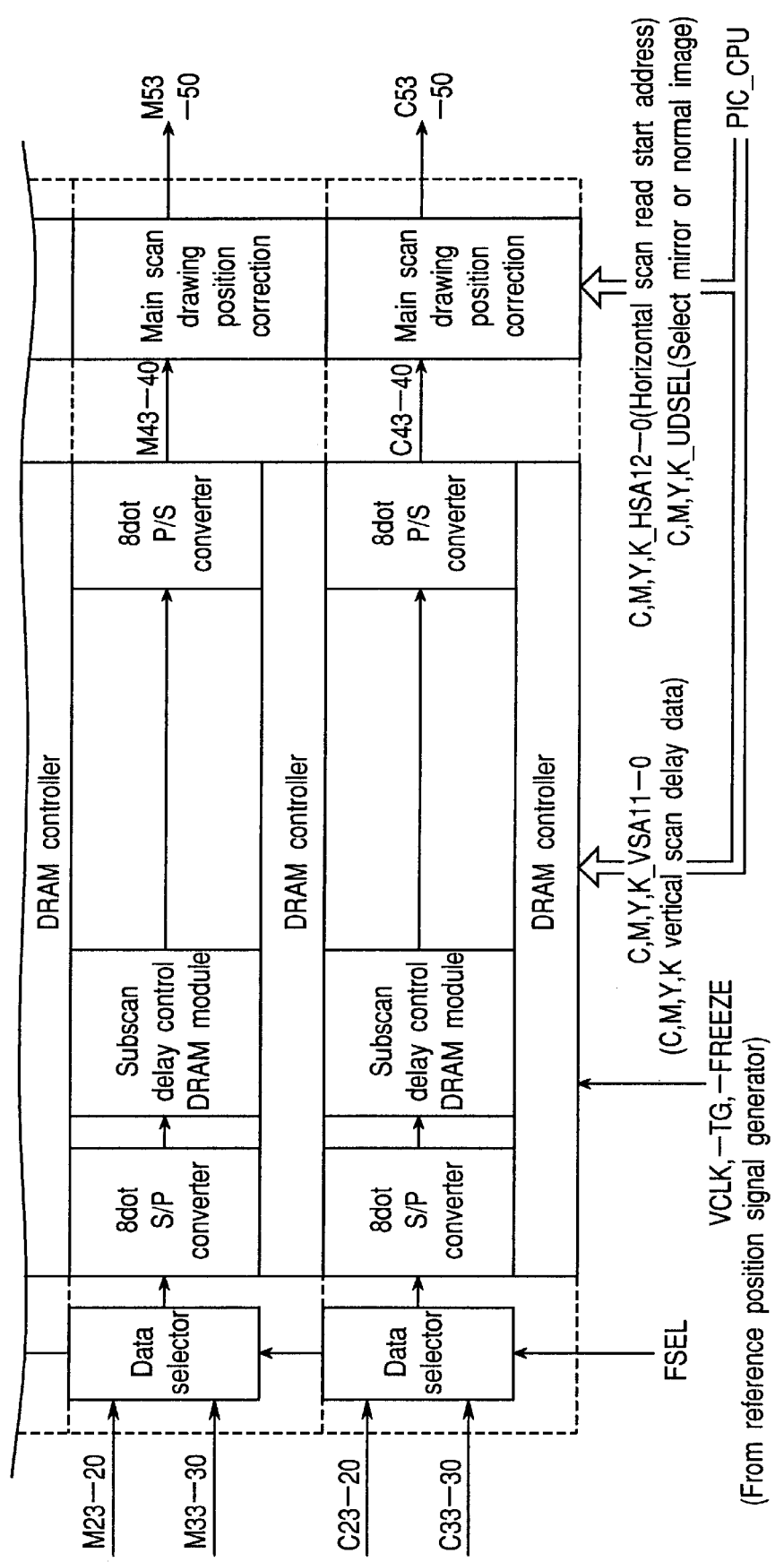
Figure 11C:
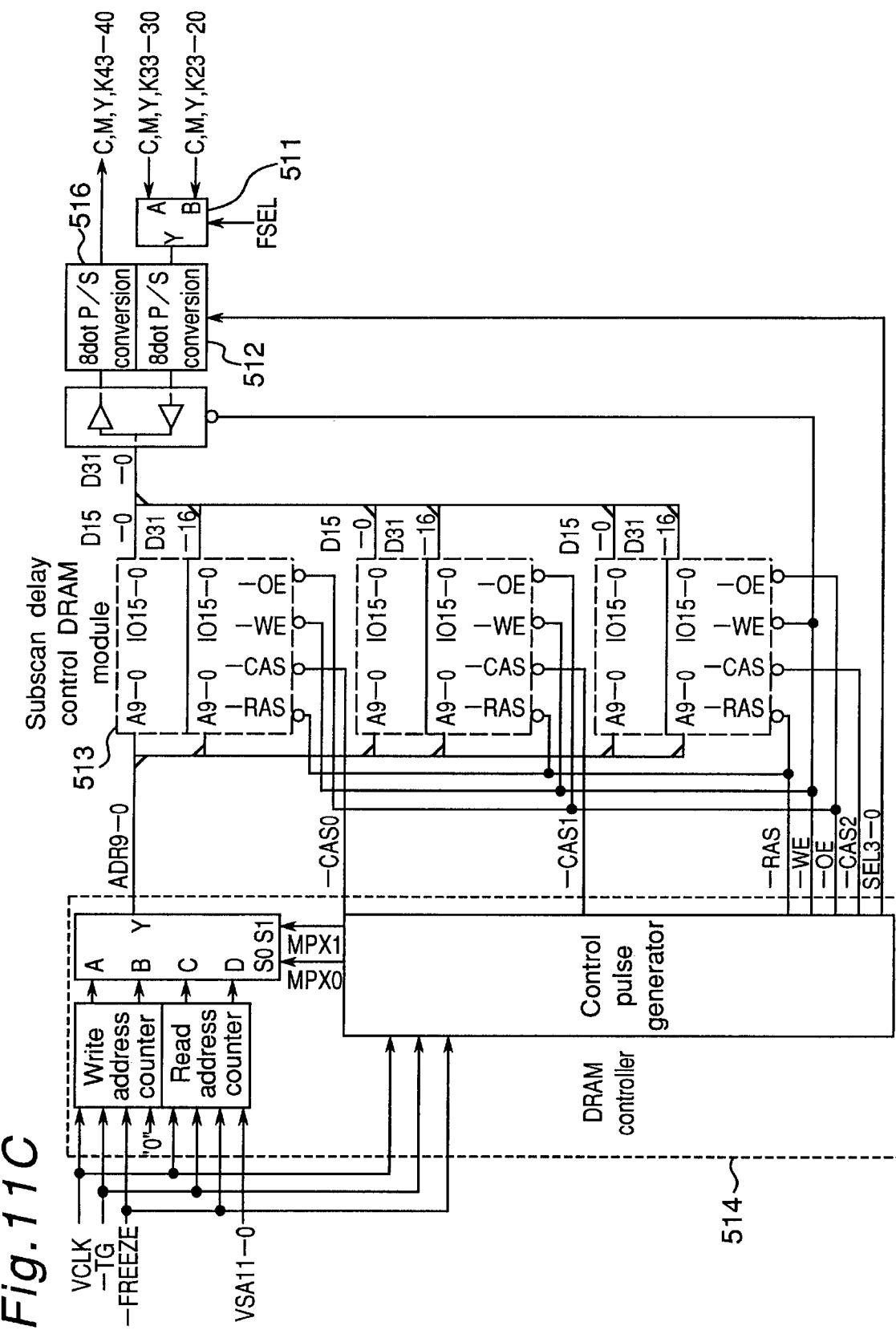
FIG. 11C is a diagram on the subscan drawing position controller.

FIGS. 11A and 11B show the drawing position controller 510 in detail especially in the subscan side. Although the same circuits are provided for the four colors C, M, Y and K, these circuits differ in the number of subscan delay control DRAM modules 513. First, a data selector 511 selects either the data C, M, Y and $K_{23-20}$ transmitted from a gradation reproducer 500 or the data C, M, Y and $K_{33-30}$ transmitted from the frame memory 520 according to an FSEL signal set by a reference position signal generator 550.

The 4-bit image data of 8 dots in the main scan, selected by the data selector 511 are inputted as one pack of serial data to an 8-dot S/P converter 512. The converter 512 coverts the serial data to 32-bit parallel data. In the following DRAM control, the data is thus read from and written to the memory by using eight dots as one cycle.

The subscan delay control DRAM modules 513 (shown in detail in FIG. 1C) perform delay control on the C, M, Y and K data in the subscan direction. The memory is controlled by addresses $ADR_{9-0}$, RAS, $-CAS_{0,\,1,\,2}$, WE and −OE which are outputted from a DRAM controller 514. The delay quantity of the subscan is determined in accordance with the difference in the count values between a write address counter and a read address counter. That is, the initial value of the write address counter is "0", while the initial value of the read counter is $VSA_{11-0}$ which is set by the central processing unit in the print imaging controller. Thus, the delay quantity of each color corresponds to the $VSA_{11-0}$ lines. The read and write address counters generate the addresses in the main scan and subscan directions. The main scan address is counted by VCLK (image synchronization clock) and reset to the initial value by −TG (main scan synchronization signal). The subscan address is counted with the −TG signal. For the read address, the count value is periodically loaded to $VSA_{11-0}$ set by the central processing unit in the print imaging controller, as described above. For the write address, the count value is loaded to zero. The address to the DRAM modules 513 is selected from these count values by the following address selector in synchronization with the DRAM control operation.

Signal −FREEZE is transmitted from the reference signal generator 550. This signal repeats "L"/"H" line by line when an image is copied on an overhead projector paper or a thick paper. (It is "H" during the normal copy.) For reproducing the image on an overhead projector or a thick paper, it is necessary to reduce a paper feeding speed to ½ of the speed for the normal copy because of thermal conductivity of the fixing unit. In this case, the subscan is operated so that the image is reproduced at 800 dpi. However, the normal 800 - dpi operation needs delay memories having a double capacity for each color. The corrector for the subscan distortion also needs first-in first-out buffer memories having a double capacity. In the case of the data of 800 dpi, a double amount of toners adhere to the paper. Thus, it is necessary to insert white data for each line. During the control at half a speed, the following operation is therefore performed in order to inhibit the read/write operation of this subscan delay memories for each line. That is, if −FREEZE="L", a DRAM control signal outputted from a control pulse generator in the DRAM controller 514 is becomes inactive. Also, the read and write address counters are stopped so as to prevent the counters from counting the address. Thereby, it is not needed to increase the memory capacity.

Next, an 8-dot P/S converter 515 converts the 32-bit parallel image data for 8 dots outputted from the subscan delay control DRAM modules 513 into the original serial data C, M, Y and $K_{43-40}$. Then, the converter 515 outputs the serial data.

Figure 12:
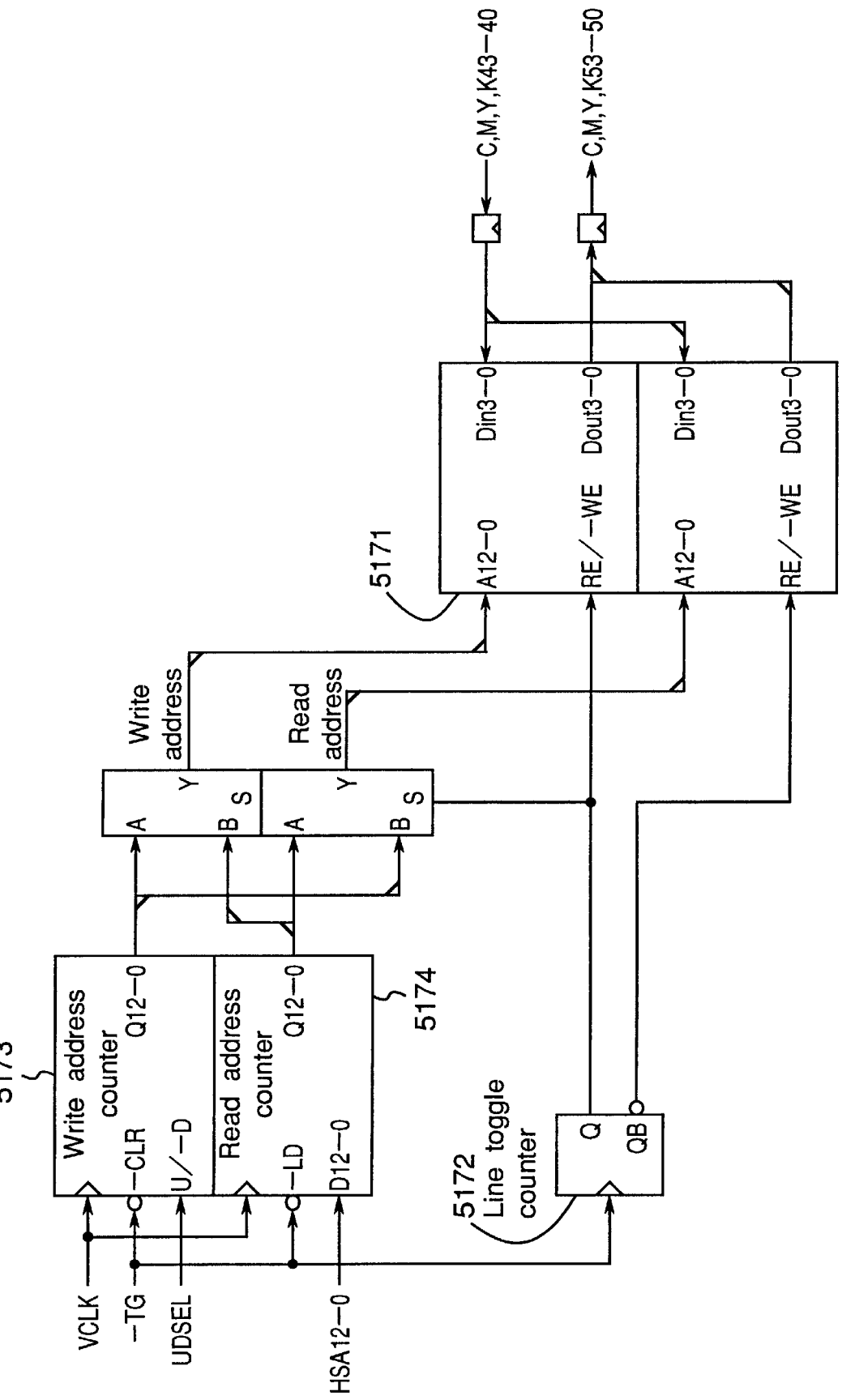
FIG. 12 is a block diagram of a main scan drawing position corrector.

FIG. 12 shows a main scan drawing position corrector 516. The data C, M, Y and $K_{43-40}$ transmitted from the subscan drawing position controller is inputted to the main scan drawing position corrector 516. After the main scan drawing position correction and the mirror image processing of the necessary data, the data C, M, Y and $K_{53-50}$ is outputted to the image distortion corrector 540. A main scan drawing position memory 5171 comprises two memories, connected in parallel, which can store the data of one line in the main scan. The write and read operations are alternately switched for the memory by a line toggle counter 5172.

For both the write and read addresses for the main scan drawing position memory 5171, the image synchronization clock VCLK is counted by counters 5173 and 5174, thereby generating a main scan address. In order to set the address counters 5173 and 5174 to an initial value at the start of the main scan, the following operation is performed. The main scan synchronous signal (−TG) is reset or inputted as a load signal. The write count value is reset to "0", and the read count value is loaded to $HSA_{12-0}$ set by the central processing unit in the print imaging controller. Because the laser scan raster direction of the C and M data is opposite to that of the reference color signal K data, the write address counters 5173 is allowed to count down from the initial value "0".

Thus, an normal image control is performed by UDSEL for the Y and K signals ="H". A mirror image control is performed by UDSEL for the C and M signals="L". $HSA_{12-0}$ set to the read address as the load value by the central processing unit in the print imaging controller, indicates a position at which the drawing is started in the main scan direction. Thus, this value permits controlling the main scan drawing start position for each color. The K image data sets drawing positions for the main scan and for the subscan so that the image is drawn on appropriate drawing positions on a paper fed onto the transfer belt 304. The other data C, M and Y set the drawing position relative to the K image data.

Figure 13A:
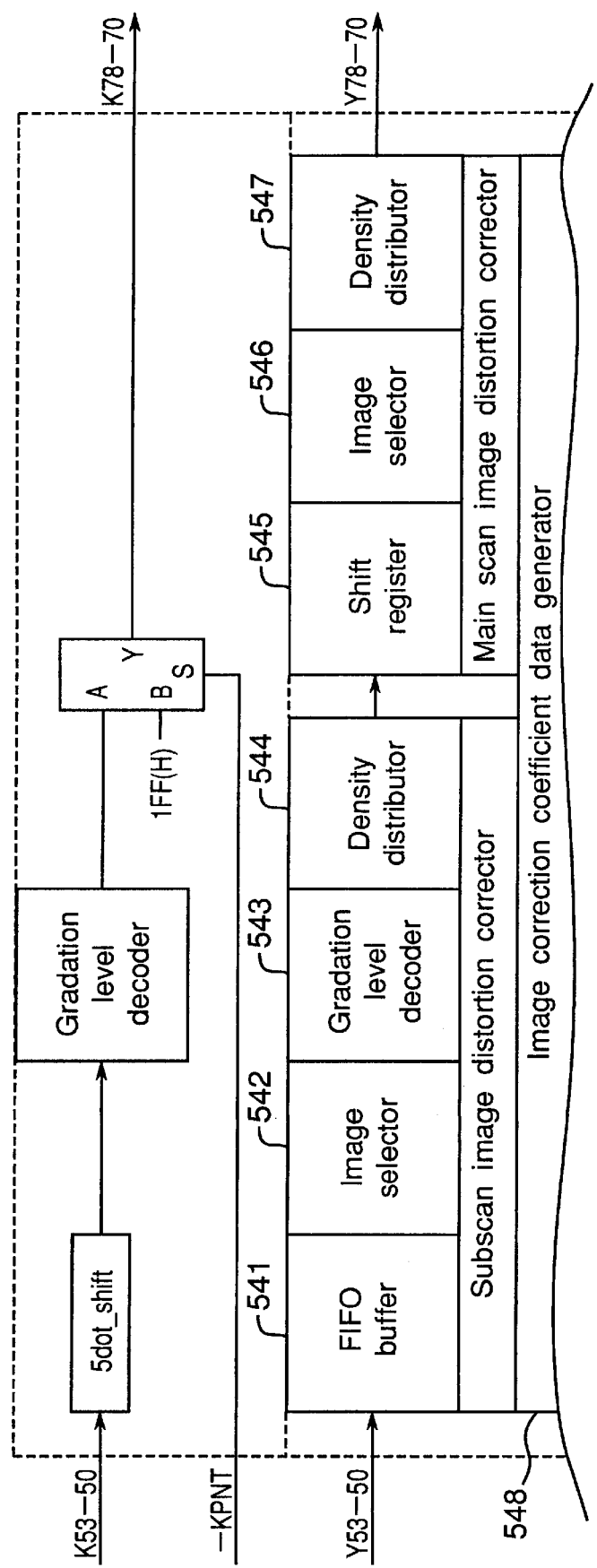
FIGS. 13A and 13B are parts of a block diagram of an image distortion corrector.
Figure 13B:
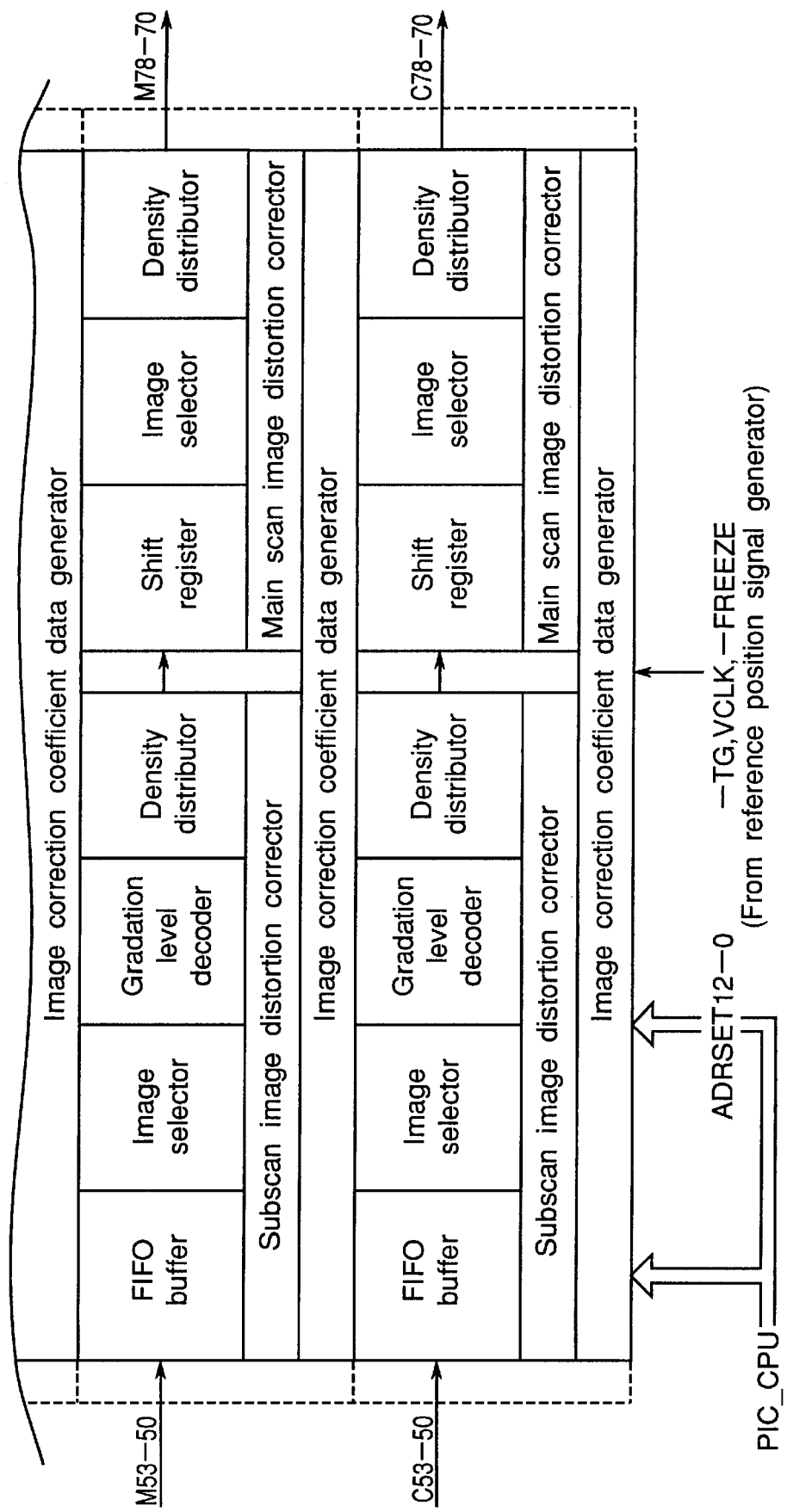

FIGS. 13A and 13B show the image distortion corrector 540 which corrects the image distortion in the main scan and subscan directions for the 4-bit data C, M, Y and $K_{53-50}$ transmitted from the drawing position controller 510. The corrector 540 outputs 9-bit data C, M, Y and $K_{78-70}$ to the print head controller. The image distortion corrector 540 has the following two functions.

(1) A memory device stores data as to a number of lines corresponding to the maximum width of the distortion (bow and skew distortions) of the image on the transfer belt 304 in the subscan direction, the distortions being caused due to the relative shift of the laser exposure position on each color photoconductor. The distortion along the subscan direction is interpolated and outputted.

(2) A flip-flop circuit stores the data as to the number of dots corresponding to the maximum width of the distortion (main scan magnification distortion) of the image on the transfer belt 304 in the main scan direction, the distortion being caused due to the relative shift of the laser exposure position on each color photoconductor. The distortion along the main scan direction is interpolated and outputted.

Figure 17:
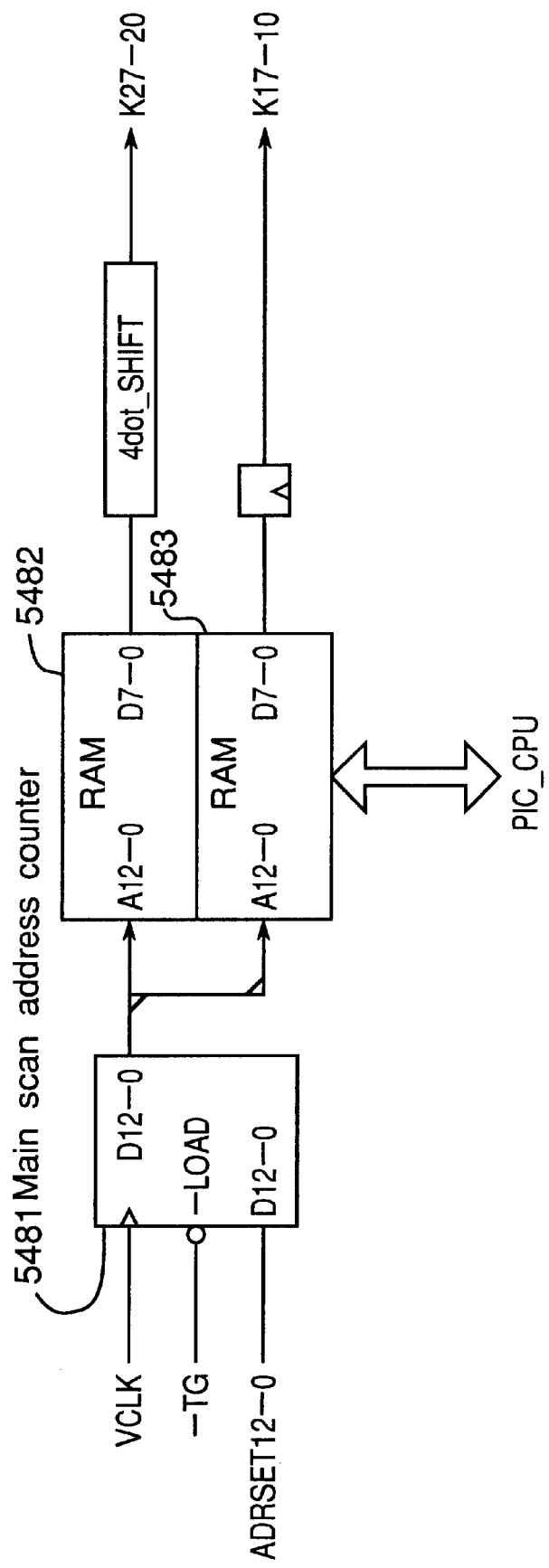
FIG. 17 is a block diagram of an image distortion coefficient data generator.

The black data is used as the reference of the above-described image distortion correction. In order to correct the relative distortion of the other three colors C, M and Y, the image distortion correction is not performed for the black data $K_{53-50}$. Meanwhile, for the other data C, M and $Y_{53-50}$, the correction data (interpolation data) is generated and the interpolated is performed for each color, so that the C, M and Y data correspond with the distortion of the black data. The same circuits are provided for the three colors C, M and Y. As explained later, interpolation data KD are stored beforehand in a line memory by calculating line select signals and density distribution quantities for each main scan address in the main scan and subscan directions. The line memory is accessed continuously according to an address generated by an address counter (refer to FIG. 17).

Figure 14A:
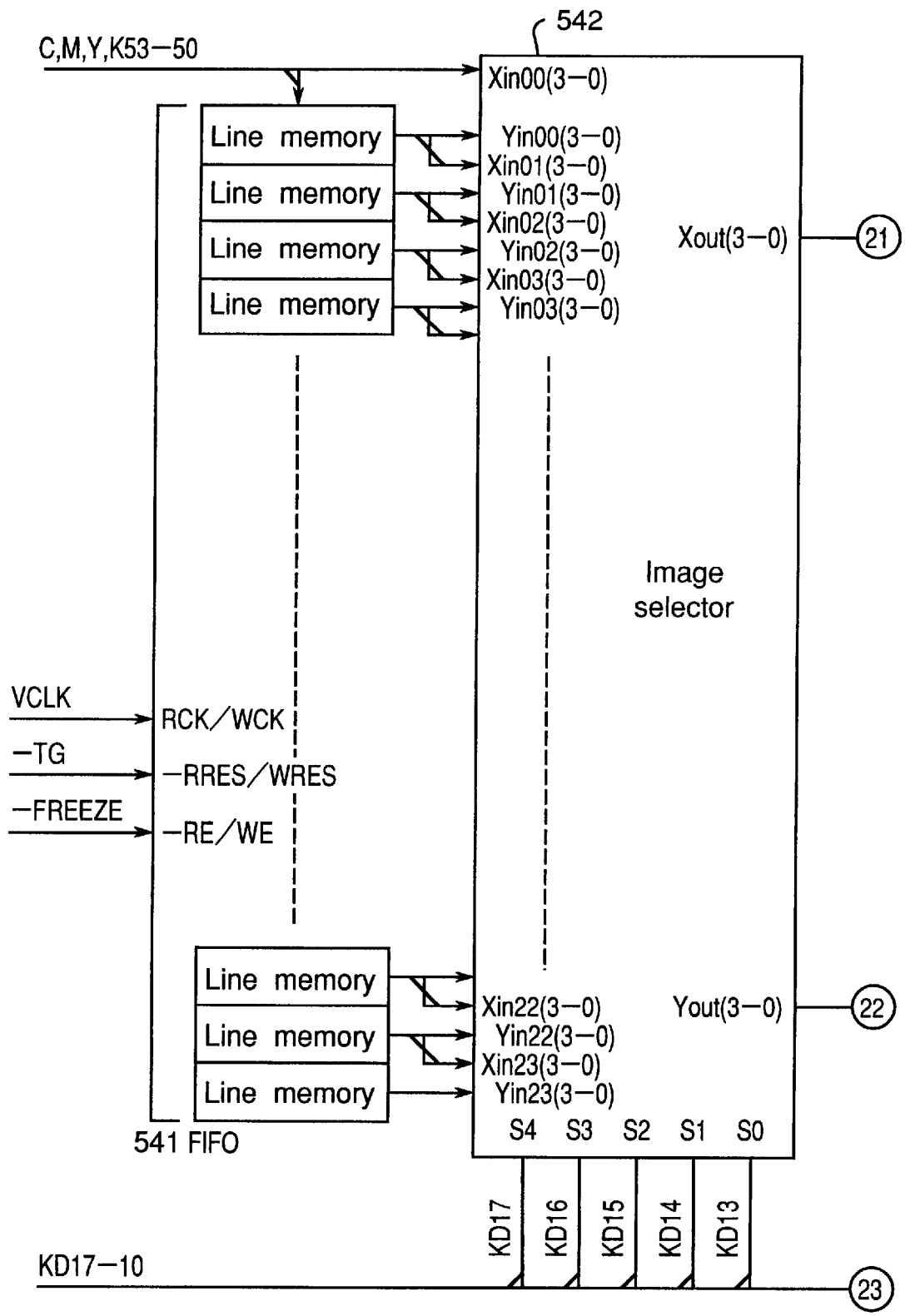
FIGS. 14A and 14B are parts of a block diagram of a subscan image distortion correction.
Figure 14B:
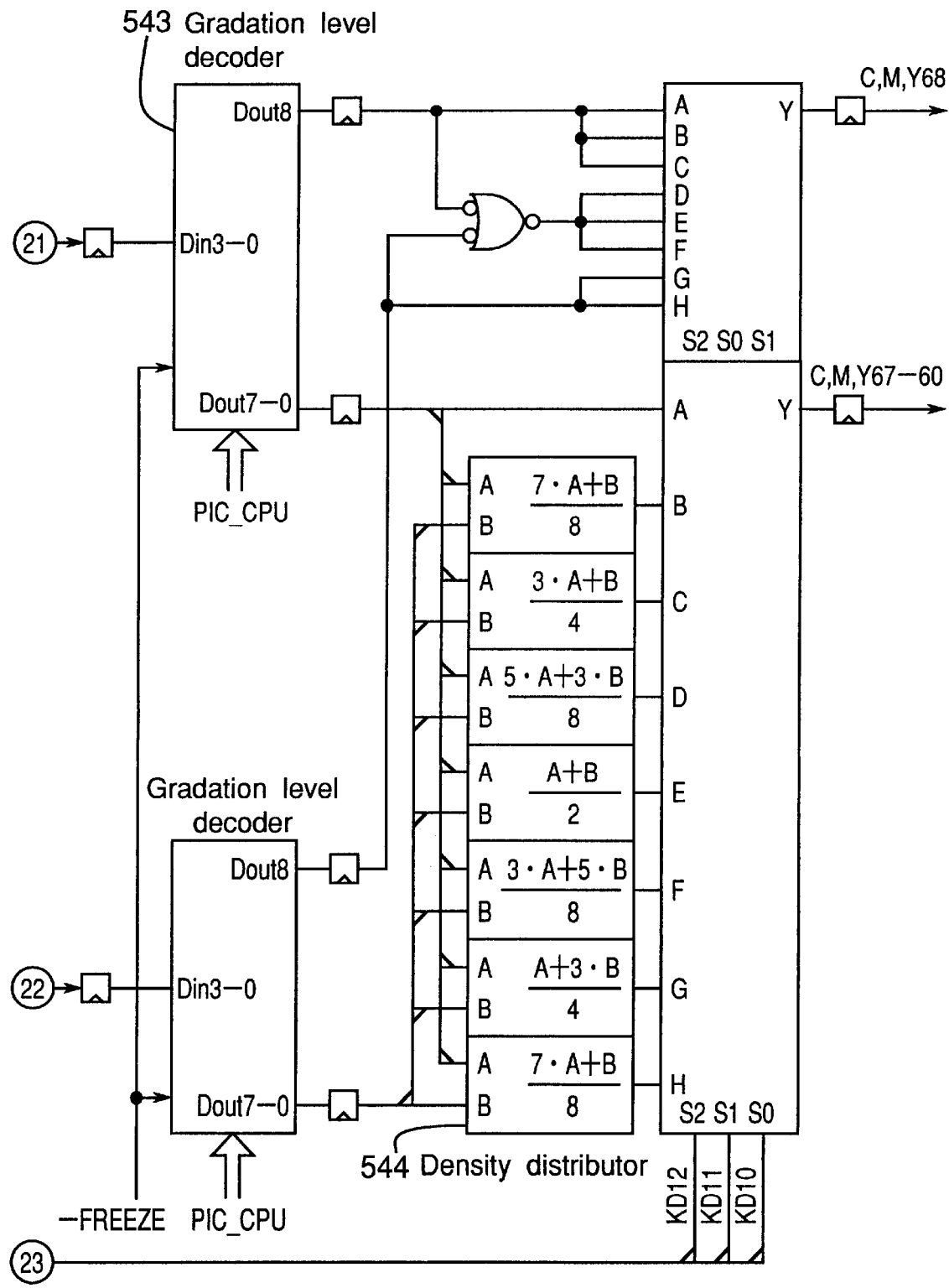

As shown in FIGS. 14A and 14B, in the subscan image distortion correction section, the data is first transmitted to a first-in first-out (FIFO) buffer memory 541 capable of storing the data corresponding to the maximum distortion width (24 lines). The FIFO buffer memory 541 stores 24 lines of the image data C, M, Y and $K_{53-50}$ continuously transmitted for each line. A read/write clock of the FIFO buffer memory 541 is VCLK. The address is reset by the −TG signal. The FIFO buffer memory 541 comprises line memories connected dependently, so that the data is sequentially delayed line by line. If −FREEZE="H", the operation is performed in the same manner as the operation for stopping the read/write of the subscan delay control DRAM. That is, the −FREEZE signal makes RE/−WE signal enable, and the operation is stopped for each line, thereby performing the half speed control for the 800-dpi operation.

The delay data of each FIFO buffer memory is inputted in parallel to an image selector 542. In order that the following density distributor 544 is easily operated, the data of two adjacent lines is outputted in parallel from data of 24 lines*4 bits supplied from the FIFO buffer memory 541 in accordance with a select control terminal $S_{4-0}$. That is, when $Xout_{3-0}$ selects n-th line delay data, $Yout_{3-0}$ outputs (n+1)-th line delay data. The signal to be selectively outputted to $Xout_{3-0}$ is selected from $Xin00_{3-0}$ to $Xin23_{3-0}$. The signal is determined by a 5-bit signal of a subscan interpolation data $KD_{17-3}$.

Figure 15:
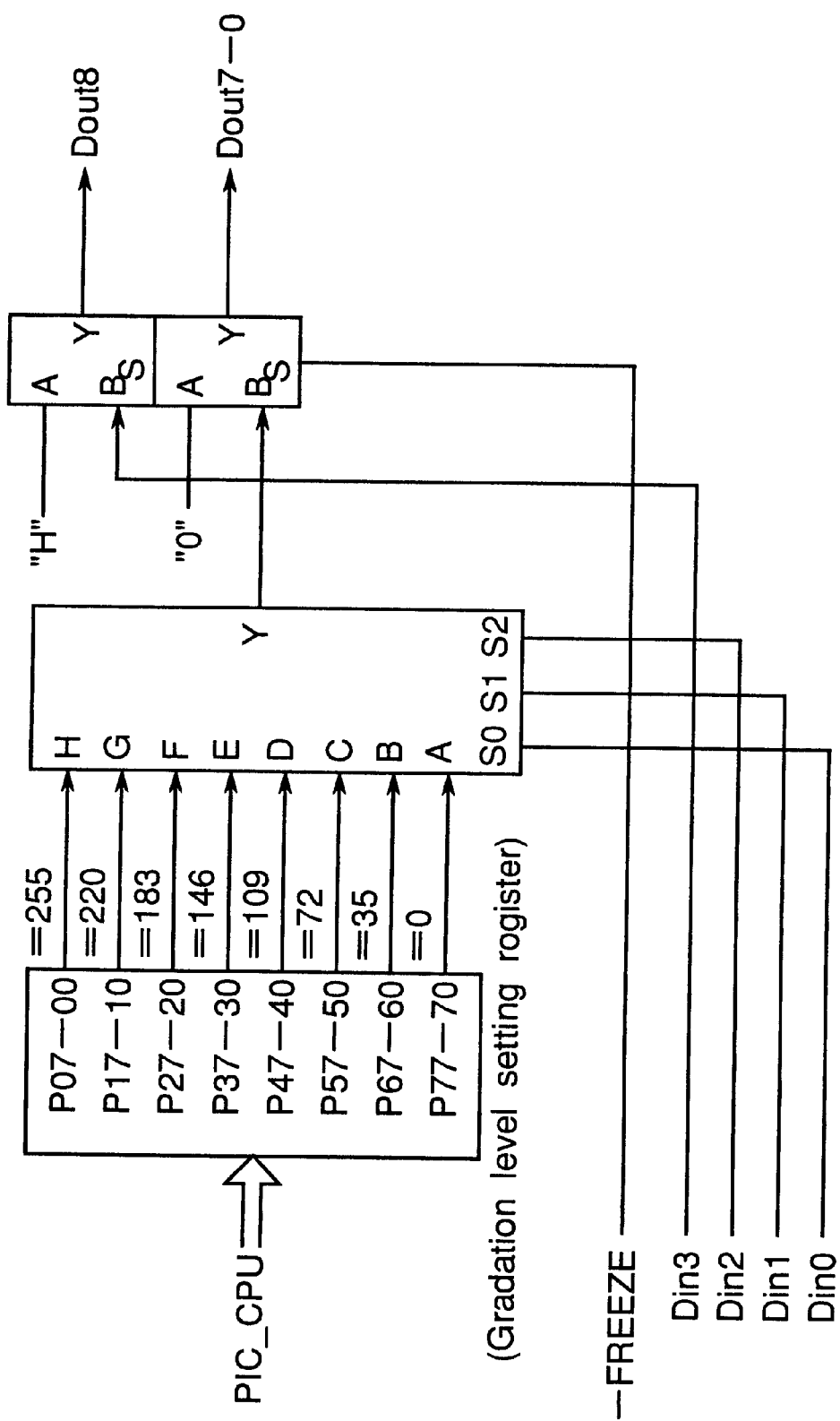
FIG. 15 is a block diagram of a gradation level decoder.

A gradation level decoder 543 (shown in detail in FIG. 15) converts or decodes bits 2–0 of $Din_{3-0}$ of input gradation level code to the gradation level corresponding to the threshold level for the 3-bit encoder in the gradation reproducer. That is, the code is changed in the following manner.

| Input code ($Din_{2-0}$) | Gradation level ($Dout_{7-0}$) |
|---|---|
| 0 → | 0 |
| 1 → | 35 |
| 2 → | 72 |
| 3 → | 109 |
| 4 → | 146 |
| 5 → | 183 |
| 6 → | 220 |
| 7 → | 255 |

$Dout_8$ represents the gradation reproduction attribute signal of each color, and it is passed through as $Dout_3$. Thus, image data of adjacent two lines are decoded to data of the original gradation level numbers before the pseudo-gradation reproduction.

If −FREEZE signal="L", the data is replaced by white ("00") for each line so that the amount of toner adhesion is equivalent to that of toner adhesion for the normal 400-dpi operation.

A density distributor 544 performs interpolation of density distribution for each ⅛ dot by using the data of two adjacent lines. That is, assuming that A is n-th line gradation level data and B is (n+1)-th line gradation level data, the interpolation is as follows.

| | |
|---|---|
| $KD_{12-10} = 0$ → | Y = A |
| $KD_{12-10} = 1$ → | Y = (7A + B)/8 |
| $KD_{12-10} = 2$ → | Y = (3A + B)/4 |
| $KD_{12-10} = 3$ → | Y = (5A + 3B)/8 |
| $KD_{12-10} = 4$ → | Y = (A + B)/2 |
| $KD_{12-10} = 5$ → | Y = (3A + 5B)/8 |

-continued

| | |
|---|---|
| $KD_{12-10} = 6 \rightarrow$ | $Y = (A + 3B)/4$ |
| $KD_{12-10} = 7 \rightarrow$ | $Y = (A + 7B)/8$ |

Figure 7:
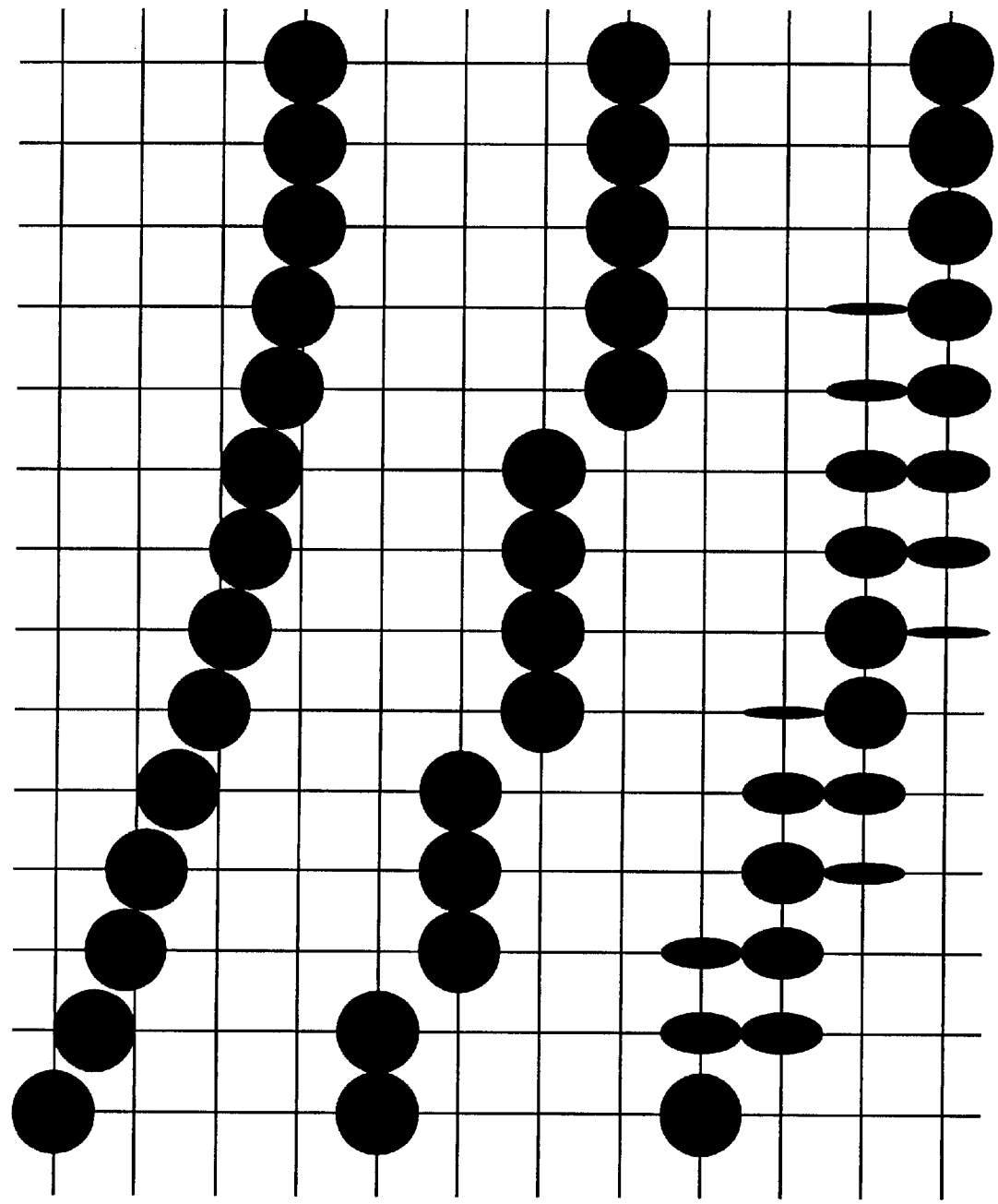
FIG. 7 is a diagram of examples of an image correction by a gradation level distribution.

A mixture ratio of inputs A:B for output Y is changed in eight ways. The interpolation data KD determines which calculation data is adopted. Assuming that a correction quantity due to the distortion is q lines, the interpolation data $KD_{17-10}$ is 8*q. Thus, the distortion corrector 540 can correct the distortion with high accuracy at every ⅛ dot within the width of 24 lines. That is, the gradation reproducer 500 reduces a memory capacity of the delay memory needed for the subscan drawing position control to ½ (this is similar for an FIFO buffer memory in the image distortion corrector) by encoding the data into the 4-bit data, while maintaining the 8-bit image quality. In an interpolator which does not need a large memory capacity, the gradation level is decoded to the 8-bit data so that the interpolation can be performed with high accuracy, thereby distributing the density. FIG. 7 shows an example of the image distortion correction using the density distribution for the subscan.

After the density distribution for the subscan, the data is outputted as C, M and $Y_{67-60}$ to the image distortion corrector for the main scan.

On the other hand, bit $Dout_8$ indicating the gradation reproduction attribute in the density distributor 544 is processed by using the data of two adjacent lines as explained below. The gradation reproduction attribute is obtained from the gradation reproduction attribute signal –LIMOS as explained before, and if the uppermost bit is "L" level, it means character edge. Now assuming that the attribute signal of n-th line is A and the attribute signal of (n+1)-th line is B, the following values are adopted for the interpolation data KD. That is, in the correction of gradation reproduction attribute (edge recognition data), calculation is performed in three ways; The edge data A is adopted, the edge data B is adopted, or if either of A and B is edge, it is adopted as edge. The interpolation data KD received from the generator 548 of image distortion correction coefficient data determines which data is adopted.

| | |
|---|---|
| $KD_{12-10} = 0 \rightarrow$ | $Y = A$ |
| $KD_{12-10} = 1 \rightarrow$ | $Y = A$ |
| $KD_{12-10} = 2 \rightarrow$ | $Y = A$ |
| $KD_{12-10} = 3 \rightarrow$ | $Y = A$ or $B$ |
| (edge if A or B is an edge) | |
| $KD_{12-10} = 4 \rightarrow$ | $Y = A$ or $B$ |
| $KD_{12-10} = 5 \rightarrow$ | $Y = A$ or $B$ |
| $KD_{12-10} = 6 \rightarrow$ | $Y = B$ |
| $KD_{12-10} = 7 \rightarrow$ | $Y = B$ |

When the amount of shift of the line from the reference position (K data) is small (within ±⅜ line), the edge attribute data of a nearby line is used. When the amount of shift of the line from the reference position is large (±⅜ or ±⅝ line), a reference is made to an OR of both the edge information (priority is given to the edge). Further, when the amount of shift of the line from the reference position (K data) is still larger (±⅝ line or larger), the edge attribute data of an adjacent line is adopted. The data, which is selected and judged as the edge, is then outputted as C, M and $Y_{68}$ to a main scan image distortion corrector including components 545–547.

Figure 16A:
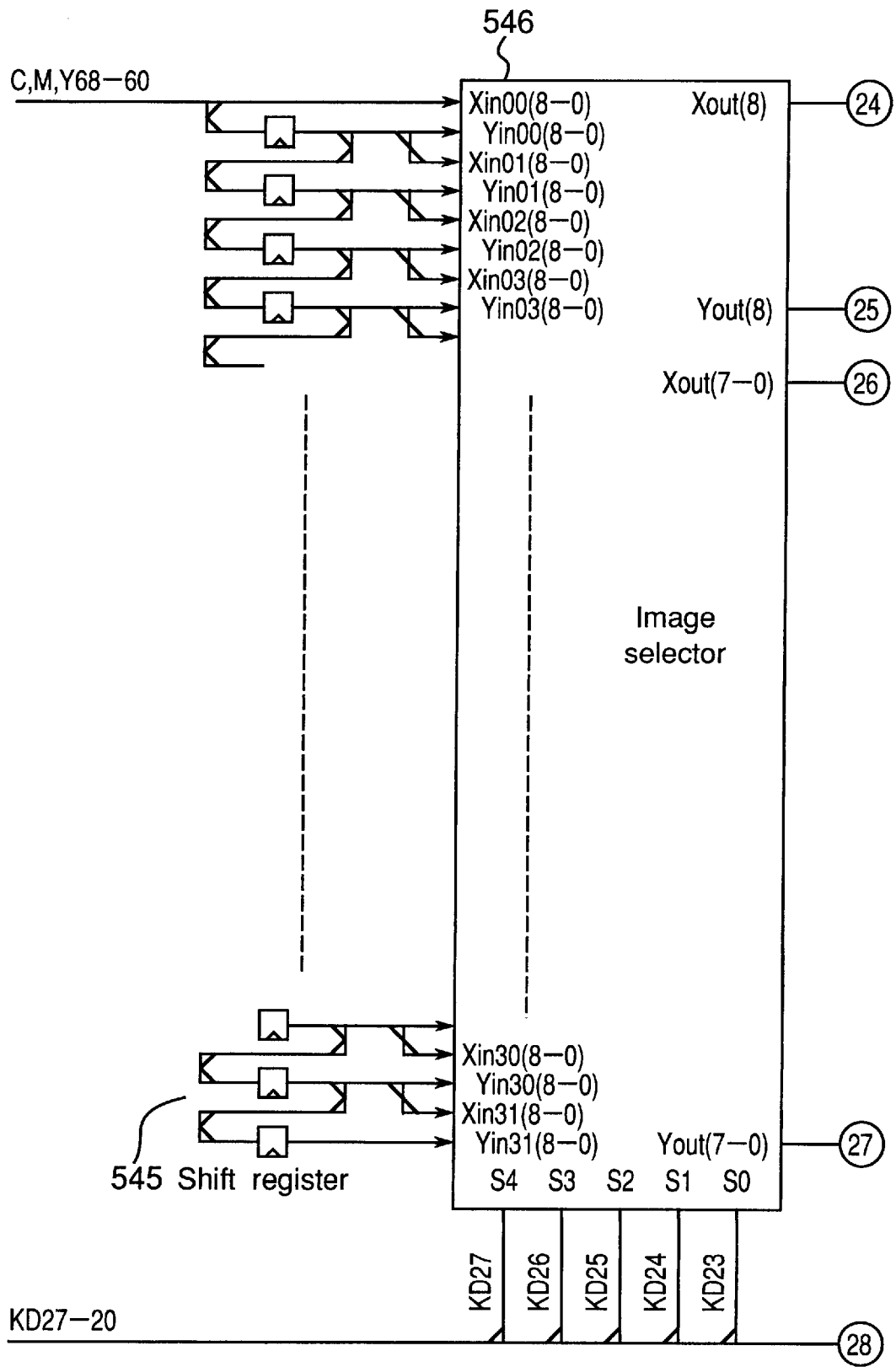
FIGS. 16A and 16B are parts of a block diagram of a main scan image distortion corrector.
Figure 16B:
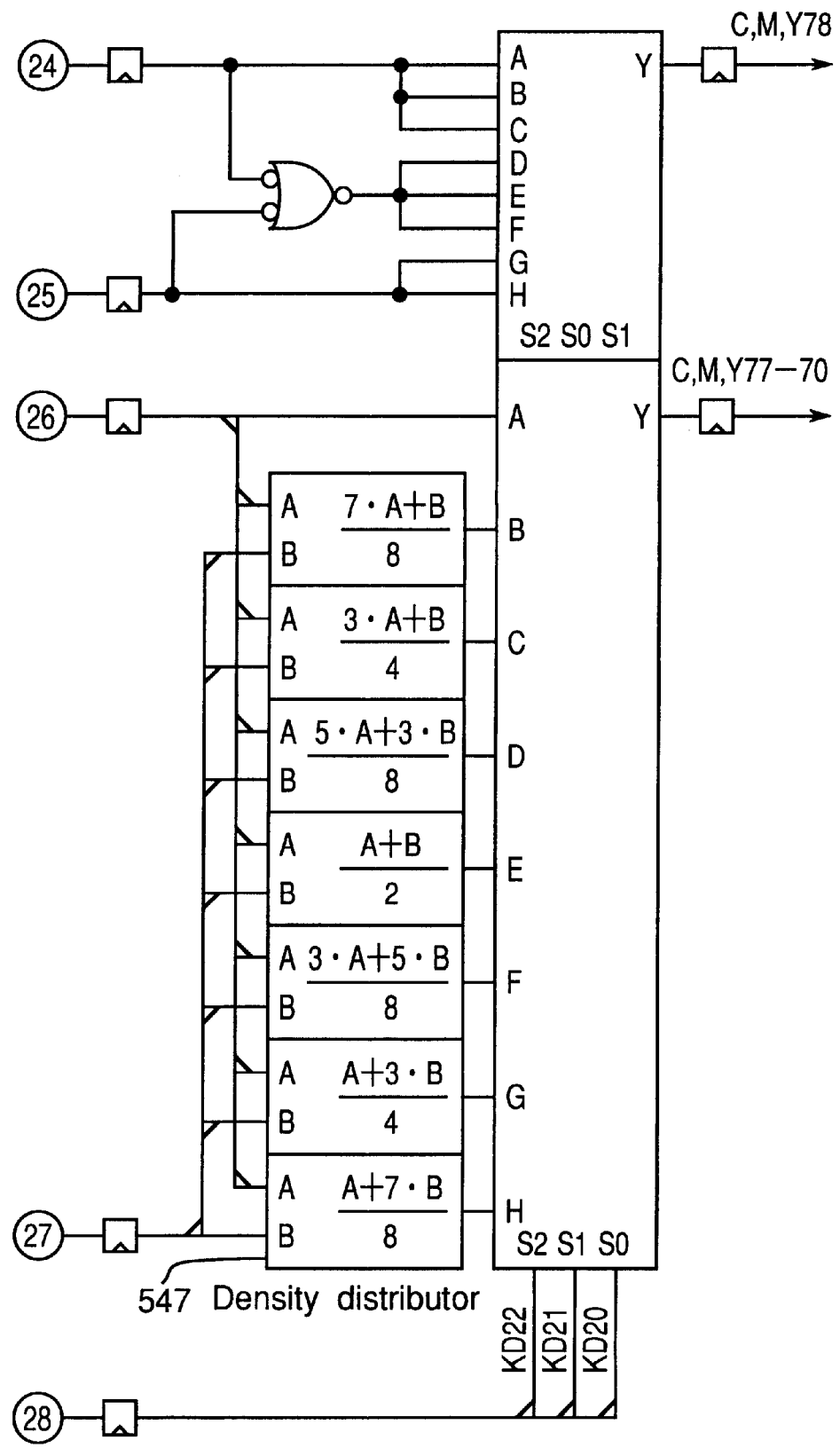

As shown in FIGS. 16A and 16B, the main scan image distortion corrector performs interpolation as in the case of the subscan distortion correction. Differently from the subscan, a shift register 545 using flip-flop circuits is used in order to generate continuous delay data along the main scan direction in stead of the FIFO buffer memory. In this case, the width of the maximum distortion correction is constituted so that 9-bit data can be delayed by 32 dots. An image selector 546 selects the data of two adjacent dots in parallel. Since the value is already decoded to gradation level, a decoder is not needed. A density distributor 547 processes the data between two adjacent dots. The density distribution and the selection of the image of two adjacent lines are accomplished in accordance with the main scan interpolation data $KD_{27-20}$.

In the above-mentioned image distortion correction for subscan and for main scan, the result of edge decision (gradation reproduction attribute) is corrected. First, the image data C, M, Y and K after the pseudo-gradation reproduction and edge decision results received from the image drawing position corrector 510 are stored in the memories of the FIFO buffer 541 and the shift resistors 545 of a plurality of lines and a plurality of pixels. In the image selectors 542 and 546, adjacent two lines and adjacent two pixels are selected in the memories of a plurality of lines and a plurality of pixels. It is determined according to the interpolation data KD received from the image distortion correction coefficient generator 548 which line is selected. In the density distribution processors 544 and 547, the edge decision results are adjusted based on the edge decision result and the density distribution signal (interpolation data KD) for the adjacent two lines or two pixels. The interpolation data KD are stored beforehand for each main scan address in the line memory by calculating the line select signal and the density distribution quantities in the main scan and subscan directions.

By performing the image correction in the main scan and subscan directions in combination with the address change and the density distribution, the image distortion is corrected at higher precision in a finer way than the unit of address for the image former of tandem structure.

An image distortion correction coefficient data generator 548 shown in FIG. 16B generates correction data (interpolation data) for correcting the image distortion along the main scan and subscan directions by using a main scan address counter 5481 (FIG. 17) and two types of lines memories 5482 and 5483 for the correction. The data on the amount of correction of the image distortion along the main scan and subscan directions to be corrected is continuously changed depending on the main scan position (address). Accordingly, the central processing unit of the print imaging controller expands continuous correction distribution data of one line in accordance with the amount of shift of the C, M and Y images from the K image obtained by the resist sensor. Then, the amount of correction is created for each main scan pixel.

The interpolation data for image correction, that is, the line selection data $KD_{17-13}$ of five bits and the density correction data $KD_{12-0}$ of three bits, are united as one data unit (one byte), and it is stored in line memories 5482 and 5483 in the main scan and subscan directions having address space in correspondence to the main scan address counter 5481. Data read is performed with the main scan address counter 5481. The management of correction data becomes simple by uniting the data in one data unit and by supplying data in correspondence to the address counter. Then, the image distortion correction system can be provided in a smaller circuit scale.

As described above, the K image is the reference image data for the C, M and Y images. In order to form an image on the transfer belt 304 on a proper position on the paper, the vertical and main scan positions of the K data are determined by the delay memory devices and by the main scan drawing position controller, respectively, in the drawing position controller 510. However, three resist sensors along the main scan direction are not arranged at the proper positions on the transfer belt 304 along the main scan direction, i.e., the sensors are not arranged at the same positions for each machine. Therefore, the relative relationship is not fixed between the sensor detection position and the address on two types of line memories (main scan and subscan image distortion correction RAMs 5482 and 5483) for expanding the correction coefficient. Thus, it is necessary to shift the distribution of the correction data in accordance with the sensor position obtained from the K resist image. The central processing unit in the print imaging controller changes the data expanded in the memory as to the distortion correction quantity in accordance with the sensor detection position.

A position at which a main scan address counter 3581 starts reading can be changed by $ADRSET_{12-0}$ (common to C, M and Y) set by the central processing unit in the print imaging controller. This counter counts VCLK, and the count value is loaded to $ADRSET_{12-0}$ by the –TG signal. The change in this value is controlled in the following reason.

Figure 18:
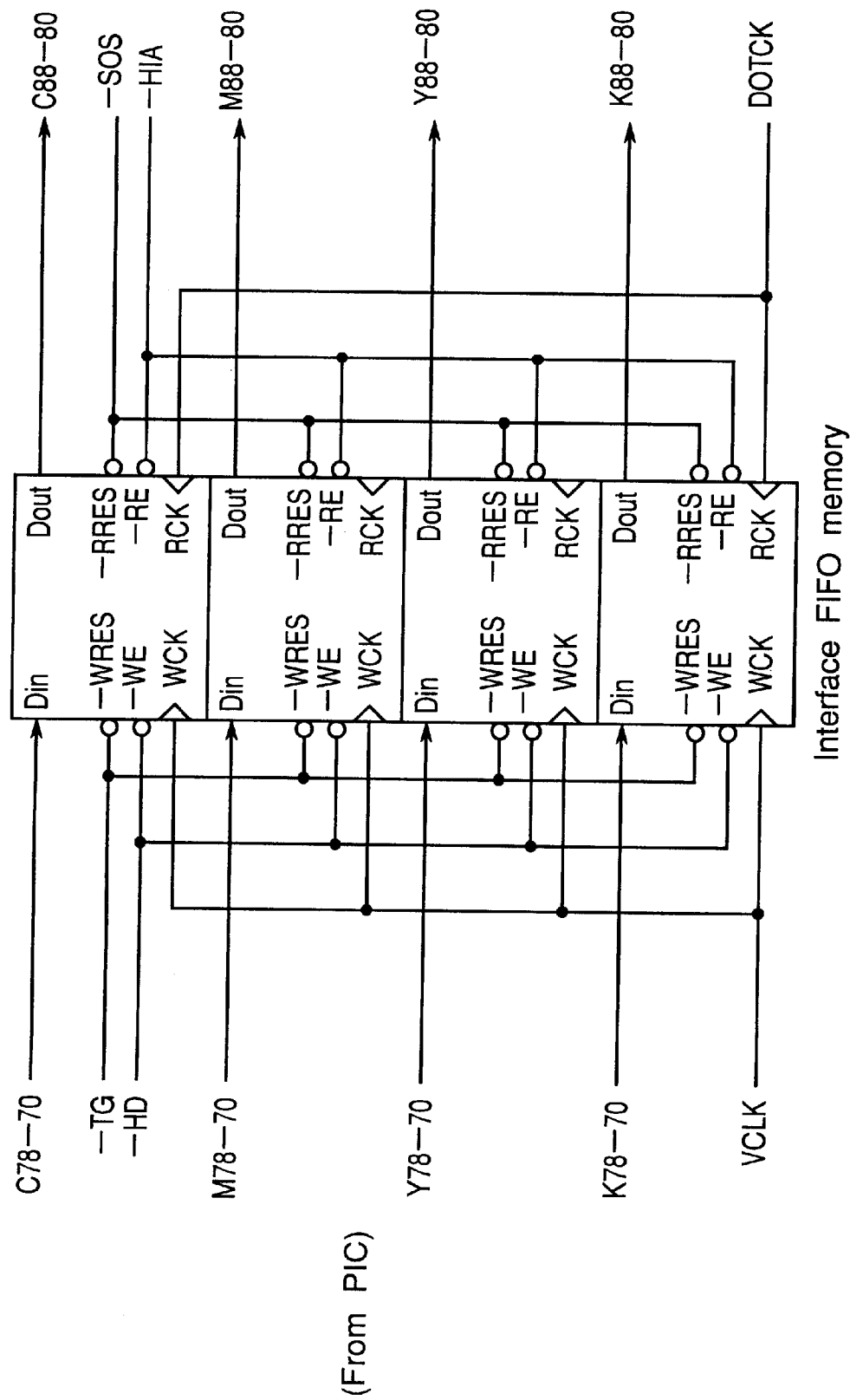
FIG. 18 is a diagram on interface between the print image controller and the print head controller.
Figure 19:
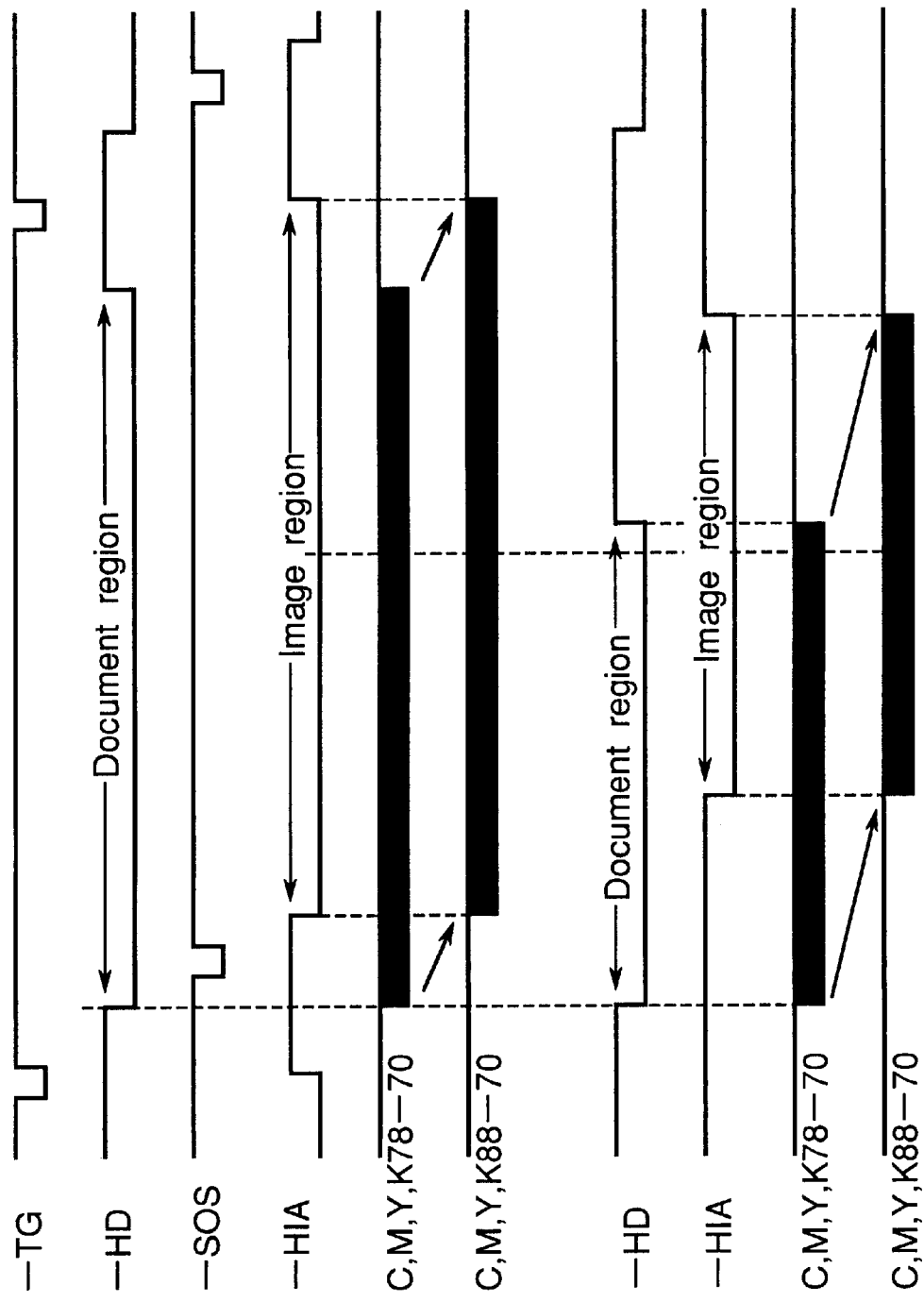
FIG. 19 is a timing chart of data transmission from the print image controller to the print head controller.

When data is transmitted from the print image controller to the print head controller, an image of the image reader 200 always has a reference position at one side because a document is put the platen glass plate 208 with reference to the end of the platen glass plate for the main scan. However, the image of the image forming section 300 has a reference at the center so that a paper is fed on the basis of the center position of a polygon motor (or the center of the transfer belt). Thus, as shown in FIG. 18, an interface between the print image controller and the print head controller comprises an interface FIFO memory. The image outputted from the print image controller is transmitted to the print head controller by converting the one-side-based image into the center-based image. FIG. 19 shows the timing chart for this processing. The main scan reference signal –TG of the image reader is used as an address write reset –WRES for the interface, and a main scan enable region signal –HD is used as a write enable (–WE), thereby controlling the write to the interface FIFO memory device. Signal –SOS is a scan start signal for the laser diode which is generated for each line according to the rotation of the polygon, and –HIA is a main scan drawing area signal used as a read enable signal –RE so as to control the read from the interface FIFO memory. Since both of –TG and –SOS are the main scan reference signals, they have the same cycle. Signal –TG is used as the reference of the read of the CCD sensor, and signal –SOS is used as the reference of the write of the laser scan. The signal –HD can be changed on the basis of the signal –TG in accordance with the range of from one side to the image read area. The signal –HIA can be changed on the basis of the center position of the signal –SOS in accordance with the width of the main scan of a paper to be fed.

An address of the memory device for expanding the image distortion correction data is generated on the basis of signal –TG. For the data generation, it is necessary to change the position for expanding the correction data, in accordance with the size of a paper to be fed, because the data is guided by detecting the resist pattern on the transfer belt 304, as described below. However, much time is wasted because the distortion correction data is expanded in the correction memory after the paper size is determined. Therefore, the load value of the main scan address generator is changed in accordance with –HIA changed with the paper and the start position from the –SOS signal, whereby the main scan position of the distortion correction coefficient is adjusted.

After the correction of the image distortion, the K data is selected as data (1FF(h)) of uniform black in the interface with the print head controller before it is written to the FIFO memory. This means that the bill recognizer 415 in the image processor of the image reader judges whether or not the document on the platen glass plate is a bill. If the document is judged as a bill, the whole surface of the image is painted with black data so as to avoid a normal copy. In a conventional full color copying machine in which an image is scanned four times, a bill is recognized when the C, M and Y images are formed before the black image is formed, and the image is painted in black when the K image is formed. On the other hand, the color copying machine like the present system for simultaneously copying four colors by one scan needs to judge whether or not a document should be painted in black while scanning the image while scan is performed. However, it is necessary for the bill recognition to select some extent of the document region any time and to perform pattern matching with a certain reference pattern in order to judge whether or not the document is a bill. Thus, a some time is required for the determination of the image read position during the scan. Sometimes, the image read position is not yet determined at the time of the image forming (or the bill recognizer 415 judges the document as a bill after the image of the bill is formed on a paper) Thus, the painting is controlled after the subscan drawing position is controlled. Thereby, the K image is delayed and controlled for at least the time corresponding to the distance between the photoconductors. A normal copy operation can be inhibited if the bill recognition is only completed for the time between the scan start and the forming of the K image on the photoconductor.

The C, M, Y and K images, C, M, Y and $K_{78-70}$, which have been subjected to the image distortion correction in the main scan and subscan directions, are transmitted to the interface (FIG. 18) between the print imaging controller and the print head controller. The drawing position is shifted with reference to the paper. The data are transmitted to the print head controller shown in FIG. 8. The data are optically modulated and exposed on each color photoconductor, whereby an image is formed.

The print position shift in the tandem structure, which is caused by the image delay due to the memories and the shift of exposure position of each color, is corrected as explained below. In the print imaging controller, the resist patterns are printed, the resist quantities are detected and the resist correction data are set. Then, the shifts of the setting positions of the resist detection sensors 314 for measuring image distortion quantities are detected, and the image distortion quantities are determined by considering the shifts.

Figure 20:
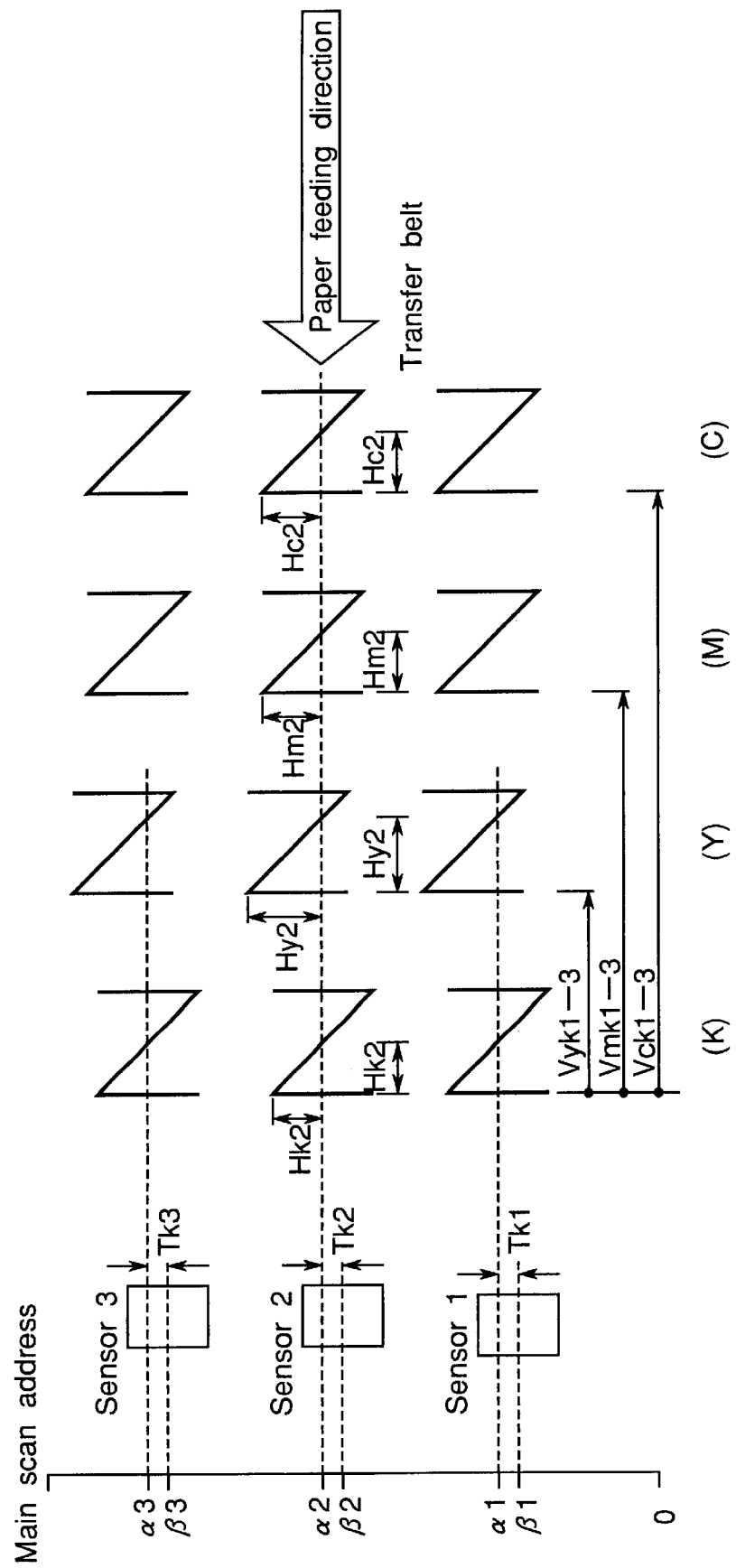
FIG. 20 is a diagram of a resist detecting pattern.

Next, it is described how the amount of shift from the resist sensor is feed-backed. FIG. 20 shows a resist detecting pattern. FIG. 20 shows the three sensors 314, the resist patterns of black, yellow, magenta and cyan and various shift quantities $Tk_i$, $Hk_i$, $Hy_i$, $\alpha_i$, $\beta_i$, $Hm_i$, $Hc_i$, $Vyk_i$, $Vmk_i$, $Vck_i$ (I=1 to 3). The resist detecting patterns are generated by the test data generator 530. This pattern is selected as an image data by the gradation reproducer 500. The three Z-shaped data are generated along the main scan direction for the resist patterns of the four colors C, M, Y and K. As shown in FIG. 20, it is to be noted that these resist patterns are formed on the transfer belt 304.

The resist patterns are printed as explained below.
(1) The central processing unit (PIC_CPU) of the print imaging controller sets the amount of subscan delay C, M, Y, K_VSA$_{11-0}$ of each color for controlling the subscan drawing position to a same control value $V_0$ for all the C, M, Y and K data, where $V_0$ is a standard position designed for K image.
(2) Next, as the main scan drawing start position, C, M, Y, K_HAS$_{12-0}$, of each color for controlling the main scan drawing position, all of C, M, Y, K is set to a same control value $H_0$ so that the K image is drawn on a proper position on the transfer belt 304, where $H_0$ is a standard position designed for K image.
(3) Then, the mirror image processing (UDSEL) is set for C and M.
(4) In order to prevent distortion correction, the RAMs 5482, 5483 (FIG. 17) for image distortion correction in the main scan and in the subscan are cleared in the image correction coefficient data generator 548. That is, "0" is written to all the data, or the image distortion correction values (the interpolation data KD$_{17-10}$ and KD$_{27-20}$) are all "0" in the main scan and subscan directions. Then, Z pattern data are output for each color by the test data generator 530.

Next, the detection of resist quantities (subscan shift quantities) is explained. The amounts Vyk, Vmk, Vck of subscan shift are calculated in accordance with the difference in the time when each color Z pattern passes above the sensor for the first time. An oblique line of the Z-shaped pattern tilts at 45 degrees. Thus, the lateral (main scan) shift of the position can be calculated by knowing the time when a horizontal line and the oblique line pass on the sensor. The amount Hck$_{1-3}$, Hmk$_{1-3}$, Hyk$_{1-3}$ of main scan color shift of each color from K are determined from the difference between the amount Hk$_{1-3}$ of position shift of K and the amounts Hc$_{1-3}$, Hm$_{1-3}$, Hy$_{1-3}$ of position shift of the colors. Further, shifts between the colors in the lateral direction can be obtained similarly by measuring the time differences between the upper horizontal lines for the Y, M and C patterns relative to the k pattern.

First, a difference between a read value and the design value when Z patterns of the reference color K (K patterns) are read, and the position shifts (errors) Tk$_1$ to Tk$_3$ of the three sensors 314 are calculated.

$$Tk_1 = Hk_0 - Hk_1,$$

$$Tk_2 = Hk_0 - Hk_2,$$

and $$Tk_3 = Hk_0 - Hk_3.$$

The positions $\beta_1$ to $\beta_3$ of the sensors 314 are determined from the values Tk$_1$ to Tk$_3$, and print addresses $\alpha_1$ to $\alpha_3$ of the Z patterns.

Next, the shifts of Y, M and C patterns relative to the K pattern in the subscan direction are calculated. As mentioned above, the time when each color Z pattern passes above the sensor for the first time is measured, and the differences of the time for the Y, M and C patterns relative to the K pattern are obtained. That is, $$Vck_i = Vc_i - Vk_i,$$

$$Vmk_i = Vm_i - Vk_i,$$

and $$Vyk_i = Vy_i - VHk_i,$$

where i=1, 2 and 3.

Similarly, a difference between a read value and the design value when Z patterns of the other colors other than the reference color are read in the main scan direction, and the image distortion quantities of each color are determined based on the differences. First, the shifts of Y, M and C patterns relative to the K pattern in the main scan direction are calculated. That is, $$Hck_i = Hc_i - Hk_i,$$

$$Hmk_i = Hm_i - Hk_i,$$

and $$Hyk_i = Hy_i - Hk_i,$$

where i=1, 2 and 3.

Next, in order to determine relative distances between the photoconductors of the colors, the average of the three sensors are determines.

$$Hyk = (Hyk_1 + Hyk_2 + Hyk_3)/3,$$

$$Hmk = (Hmk_1 + Hmk_2 + Hmk_3)/3,$$

and $$Hck = (Hck_1 + Hck_2 + Hck_3)/3.$$

Similarly, relative shifts of the colors in the subscan direction to the K pattern are calculated for the Y, M and C patterns. That is, in order to determine relative distances between the photoconductors of the colors, the average of the three sensors are determines.

$$Vyk = (Vyk_1 + Vyk_2 + Vyk_3)/3,$$

$$Vmk = (Vmk_1 + Vmk_2 + Vmk_3)/3,$$

and $$Vck = (Vck_1 + Vck_2 + Vck_3)/3.$$

As explained above, the color shift data transmitted to the print imaging controller include the color shift quantities Hck$_i$, Hmk$_i$ and Hyk$_i$ in the main scan direction and Vck$_i$, Vmk$_i$ and Vyk$_i$ in the subscan direction, where i=1, 2 and 3, and the position shift data Tk$_1$ to Tk$_3$ of the three sensors 314 relative to the K image. The color shift quantities Vck$_i$, Vmk$_i$ and Vyk$_i$, where i=1, 2 and 3, relative to the reference color (K) in the subscan direction agree generally to distances between the photoconductors of the colors.

Next, the setting of resist correction data is explained. It is assumed here that the absolute values of the calculated correction data such as Hck, Hmk, Hyk, Vck, Vmk and Vyk are equal to or smaller than Hen/2 or Ven/2, where Hen and Ven are possible correction width (for example 32) in the horizontal and vertical directions, respectively. If the absolute values of Hck, Hmk, Hyk, Vck, Vmk and Vyk are larger than Hen/2 or Ven/2, the correction by an amount larger than a possible correction width is not possible. Then, clamping is performed to rewrite at Hen/2 or Ven/2. That is, even if the result of image distortion detection (correction data) exceeds the maximum distortion quantity Hen/2 or Ven/2 possible for bow distortion correction, it is replaced with the maximum distortion quantity Hen/2 or Ven/2 possible for bow distortion. Then, if the distortion quantity is very small, the ability of the distortion corrector circuit is used as much as possible, and the conditions which allow copying are satisfied.

The correction data of drawing positions in the main scan direction are set as follows, where an offset is given to have a default value at the center of possible correction width in the horizontal direction.

$$K\_HSA_{12-0}=H_o,$$

$$Y\_HSA_{12-0}=H_o-Hen/2-Hyk,$$

$$M\_HSA_{12-0}=H_o-Hen/2-Hmk,$$

and $$C\_HSA_{12-0}=H_o-Hen/2-Hck,$$

where $H_0$ is the standard position designed for K image and Hen is the possible correction width (for example 32) in the horizontal direction.

Further, the correction data of drawing positions in the subscan direction are set as follows, where an offset is given to have a default value at the center of possible correction width in the vertical direction.

$$K\_VSA_{11-0}=V_o,$$

$$Y\_VSA_{11-0}=V_o-Ven/2-Vyk,$$

$$M\_VSA_{11-0}=V_o-Ven/2-Vmk$$

and $$C\_VSA_{11-0}=V_o-Ven/2-Vck,$$

where $V_0$ is the standard position designed for K image and Ven is the possible correction width (for example 32) in the subscan direction.

Figure 21:
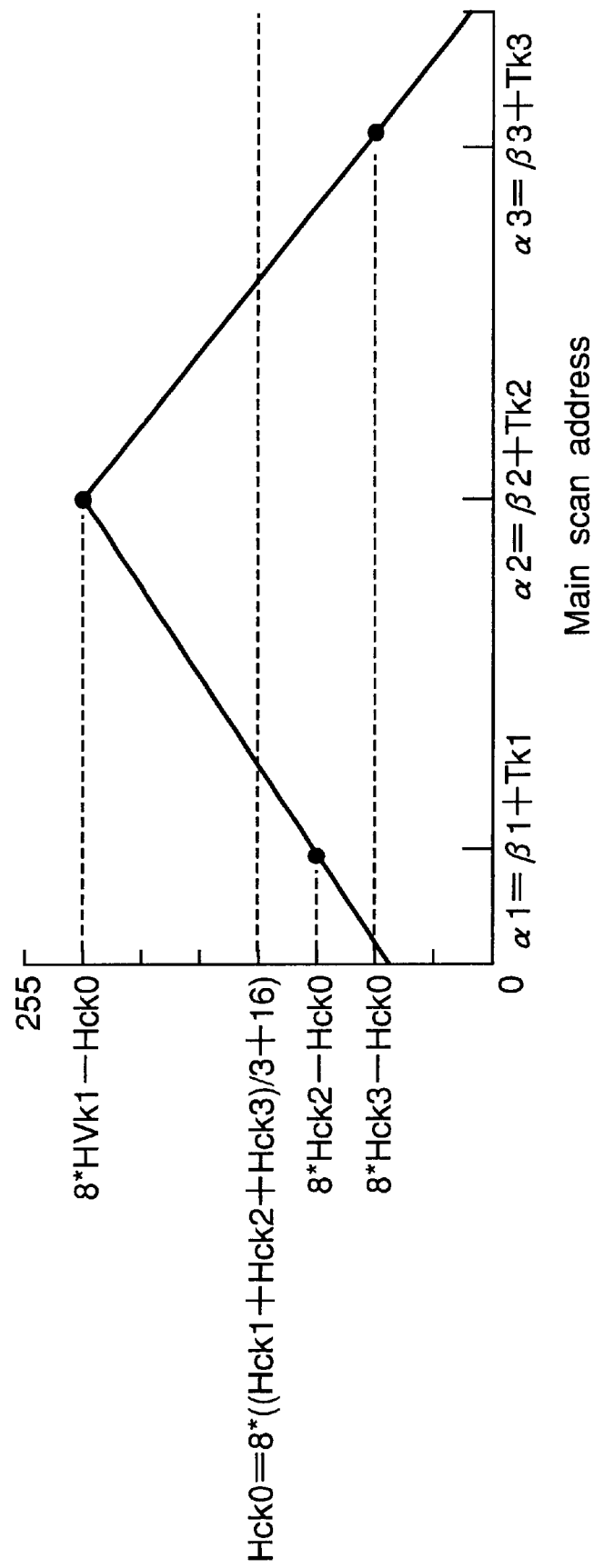
FIG. 21 is a diagram of main scan distortion correction.

Next, the distortion correction data (interpolation data $KD_{27-20}$) in the main scan are set as follows. The distortion correction data are developed in the distortion correction memory for the main scan direction as a secondary approximation curve as shown in FIG. 21 based on the position shift quantities $Tk_1$ to $Tk_3$ of the sensors and the shift quantities $Hck_i$, $Hmk_i$ and $Hyk_i$, where i=1, 2 and 3, relative to the K image in the main scan direction. In the distortion corrector 540, the shift quantity by q lines corresponds to 8*q for the interpolation data $KD_{17-10}$.

Figure 22:
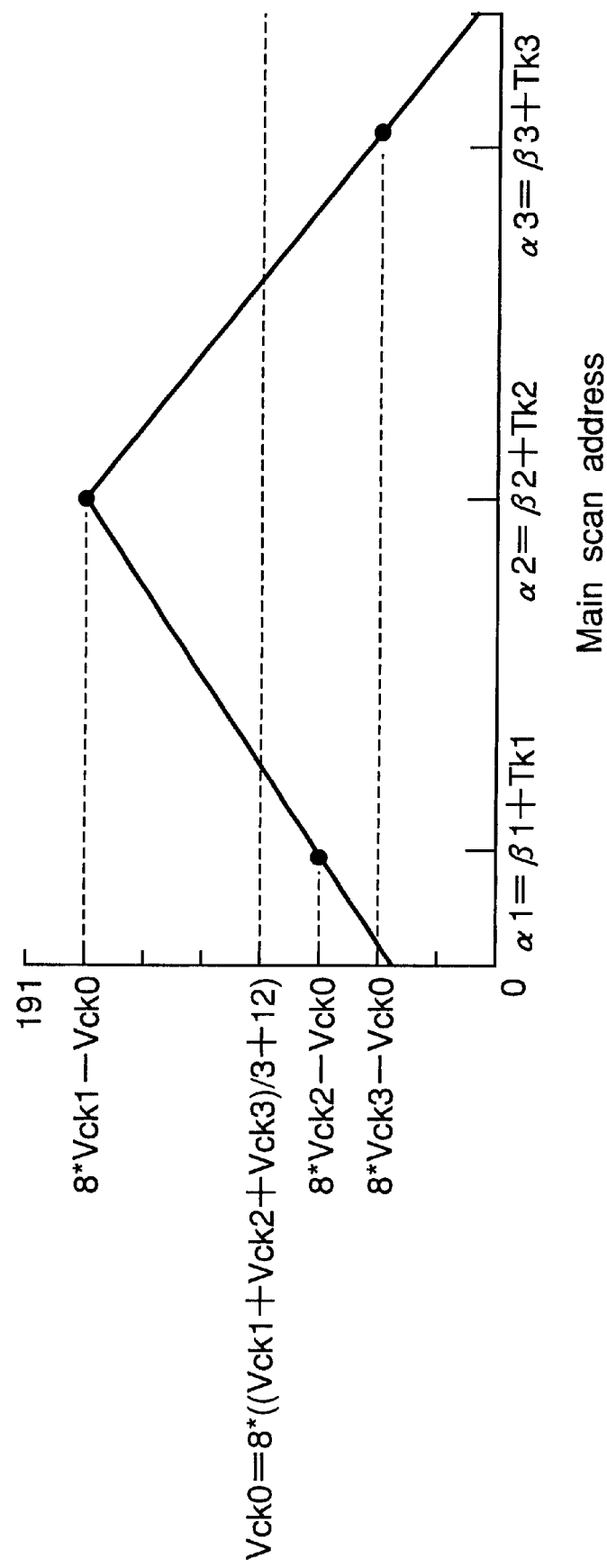
FIG. 22 is a diagram of subscan distortion correction.

On the other hand, the distortion correction data (interpolation data $KD_{17-10}$) in the subscan are set as follows. The distortion correction data are developed in the distortion correction memory for the subscan direction as a secondary approximation curve as shown in FIG. 22 based on the position shift quantities $Tk_1$ to $Tk_3$ of the sensors and the shift quantities $Vck_i$, $Vmk_i$ and $Vyk_i$, where i=1, 2 and 3, relative to the K image in the vertical direction. In the distortion corrector 540, the shift quantity by q lines corresponds to 8*q for the interpolation data $KD_{27-20}$.

Figure 23:
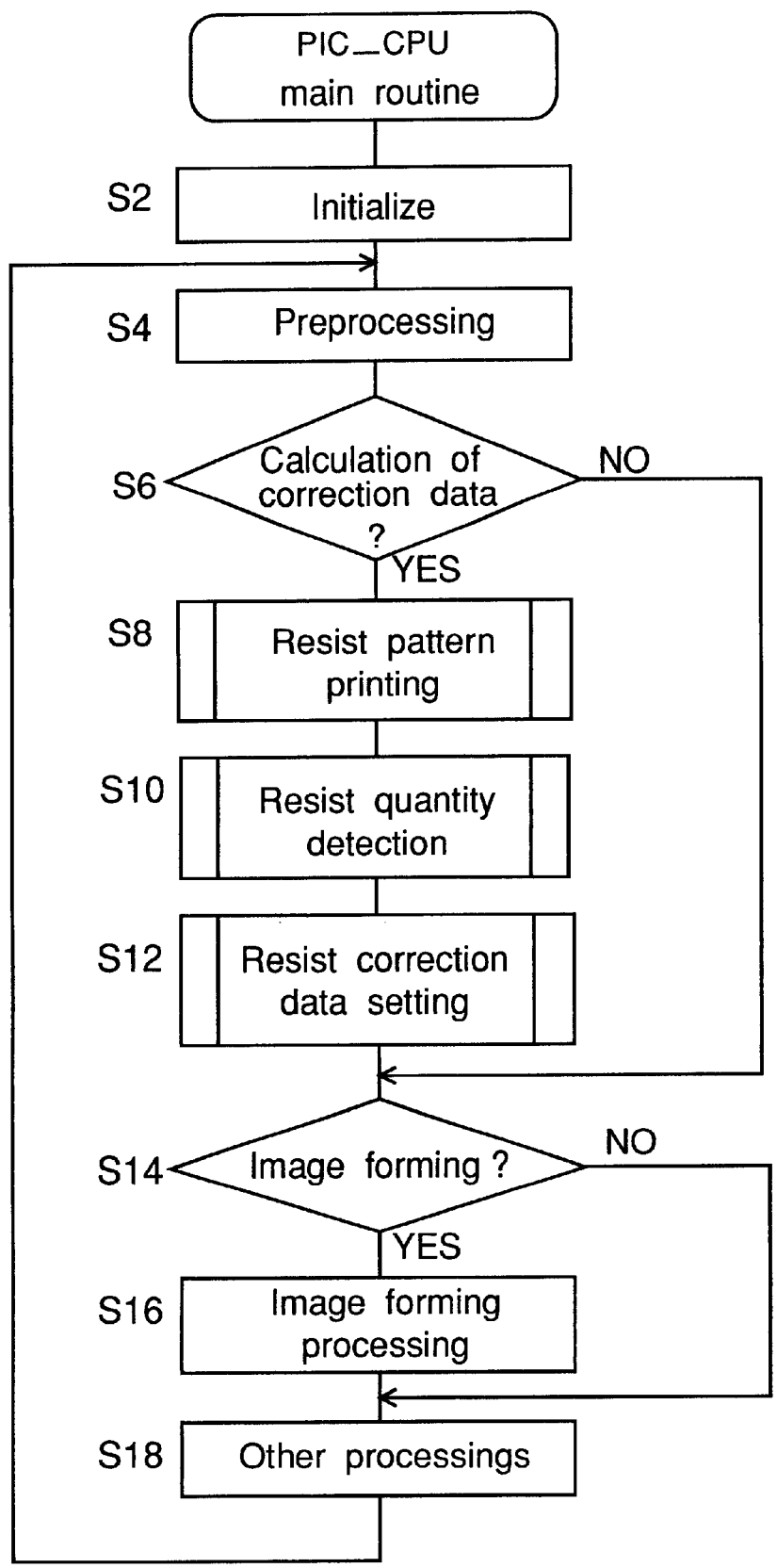
FIG. 23 is a flowchart of the print imaging controller.

FIG. 23 is a flowchart of a main routine of the print imaging controller. After the initialization (step S2) and the preprocessing (step S4), various processing are performed. First, it is decided whether a processing of calculation of correction data is performed or not (step S6). If the processing of calculation of correction data is performed, resist patterns are printed (step S8, refer to FIG. 24), resist quantities are detected with the sensors 306 (step S10) and resist correction data are set (step S12, refer to FIG. 25). Next, it is decided whether image forming is performed or not (step S14, refer to FIG. 26). If image forming is performed, a processing of image forming is performed (step S16). Then, other processings are performed (step S18), and the flow returns to step S4.

Figure 24:
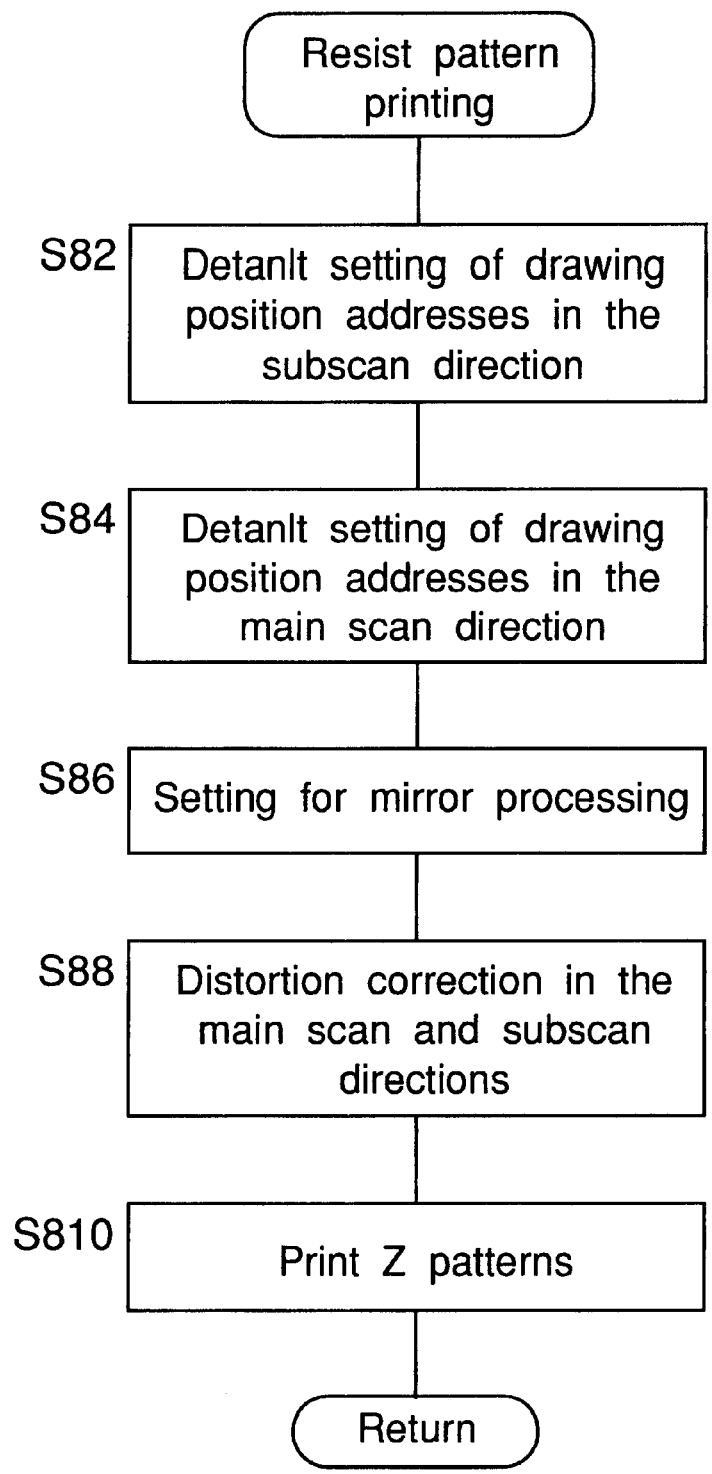
FIG. 24 is a flowchart of resist pattern printing.

FIG. 24 is a flowchart of the resist pattern printing (step S8 in FIG. 23). Default values of drawing position address in the subscan direction are set (step S82), and those of drawing position address in the main scan direction are set (step S84). Then, the mirror image processing is performed (step S86). Next, the distortion correction RAMs 5482, 5483 for the main scan and subscan directions are cleared (step S88). Finally, Z patterns are printed (step S810), and the flow returns to the main flow.

Figure 25:
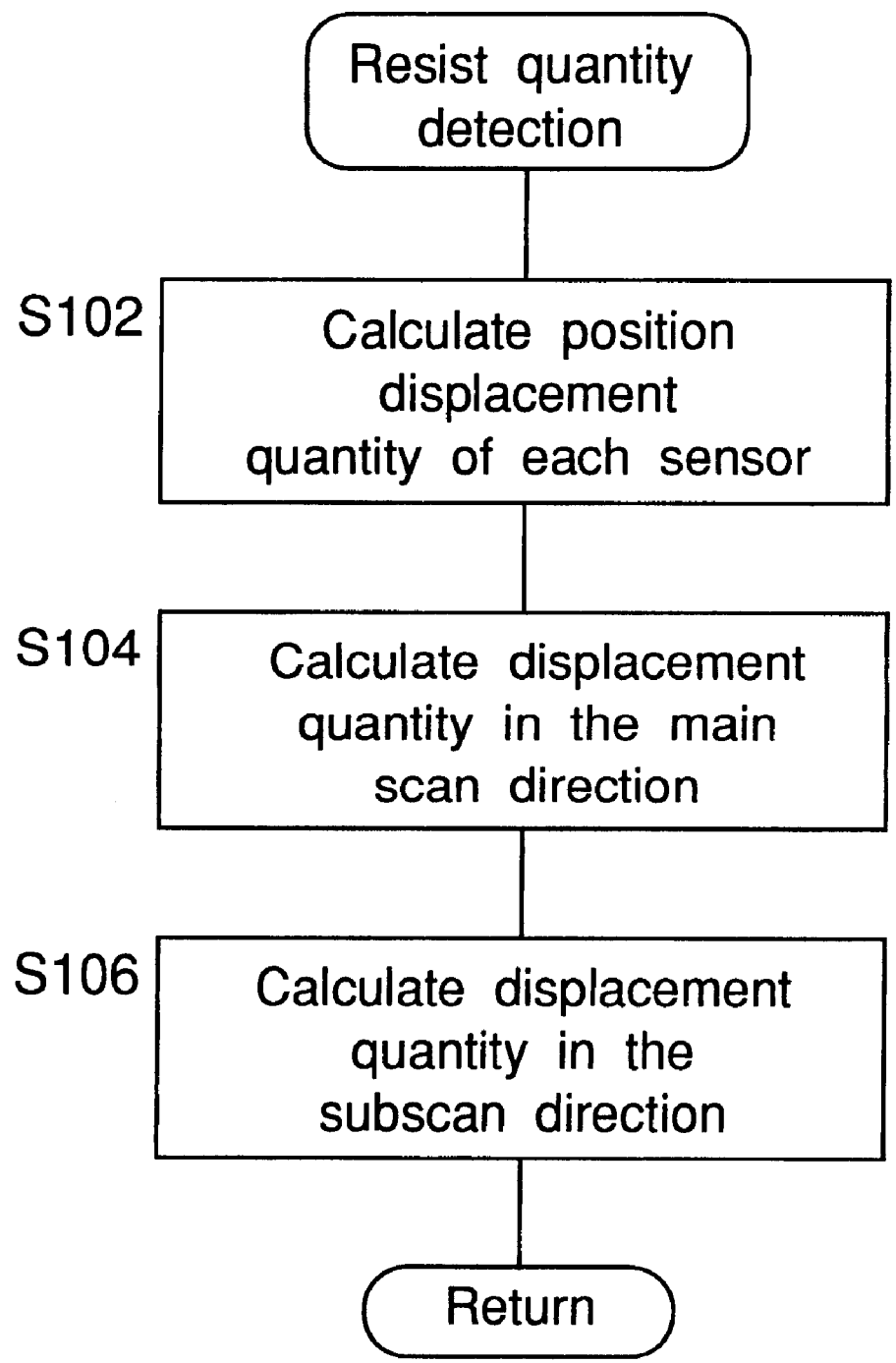
FIG. 25 is a flowchart of detection of resist quantity.

FIG. 25 is a flowchart of the resist quantity detection (step S10 in FIG. 23). Position displacement of each sensor is calculated (step S102), and displacement quantities in the main scan direction and in the subscan direction are calculated (steps S104 and S106).

Figure 26:
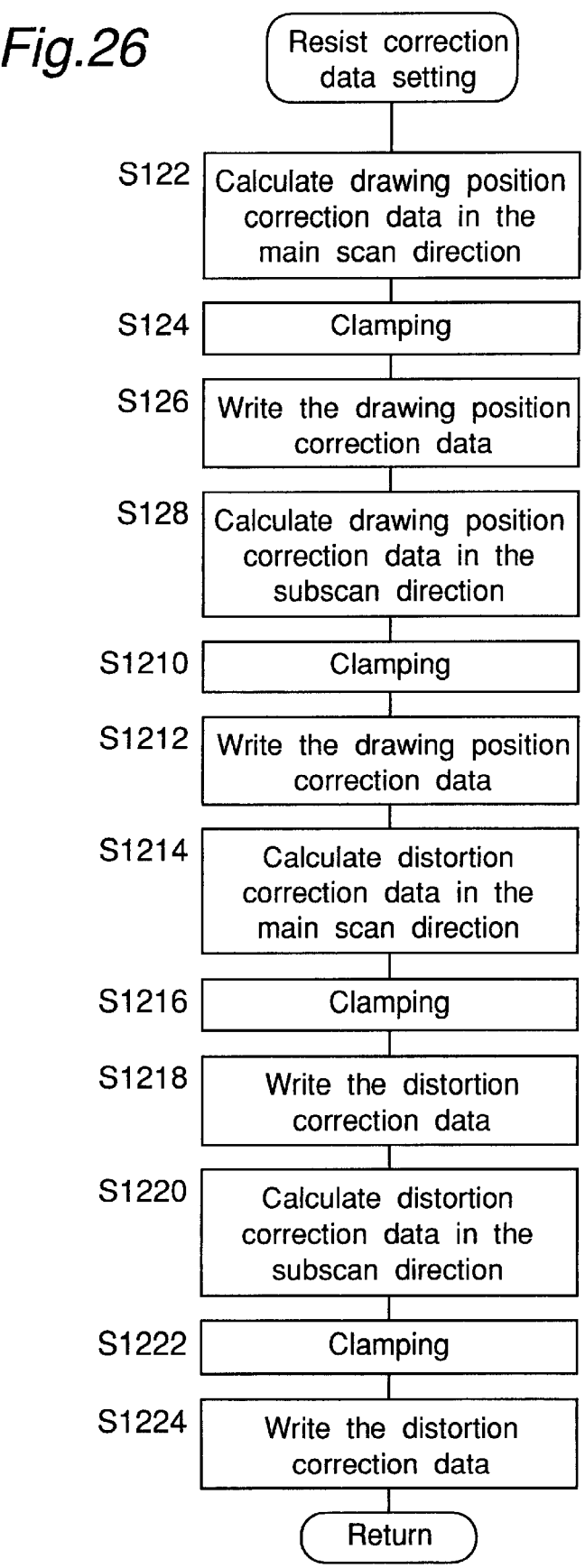
FIG. 26 is a flowchart of setting of resist correction data.

FIG. 26 is a flowchart of the resist correction data setting (step S12 in FIG. 23). First, drawing position correction data in the main scan direction are calculated (step S122), and clamping processing is performed (step S124). Then, the drawing position correction data are written (step S126). Similarly, drawing position correction data in the subscan direction are calculated (step S128), and clamping processing is performed (step S1210). Then, the drawing position correction data are written (step S1212). Next, distortion correction data in the main scan direction are calculated (step S1214), and clamping processing is performed (step S1216). Then, the distortion correction data in the main scan direction are written (step S1218). Next, distortion correction data in the subscan direction are calculated (step S1220), and clamping processing is performed (step S1222). Then, the distortion correction data in the subscan direction are written (step S1224).

Figure 27A:
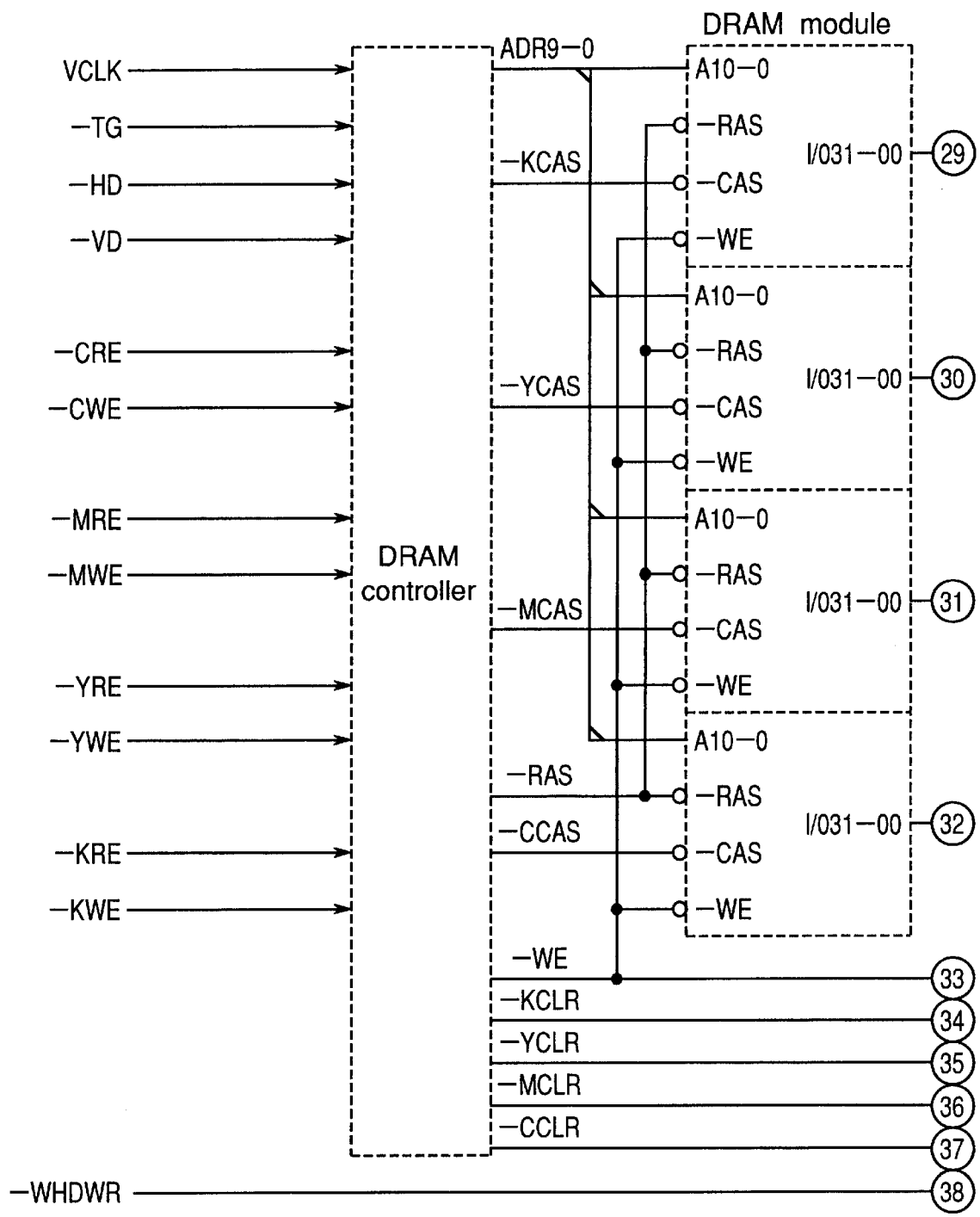
FIGS. 27A and 27B are parts of a block diagram of a frame memory.
Figure 27B:
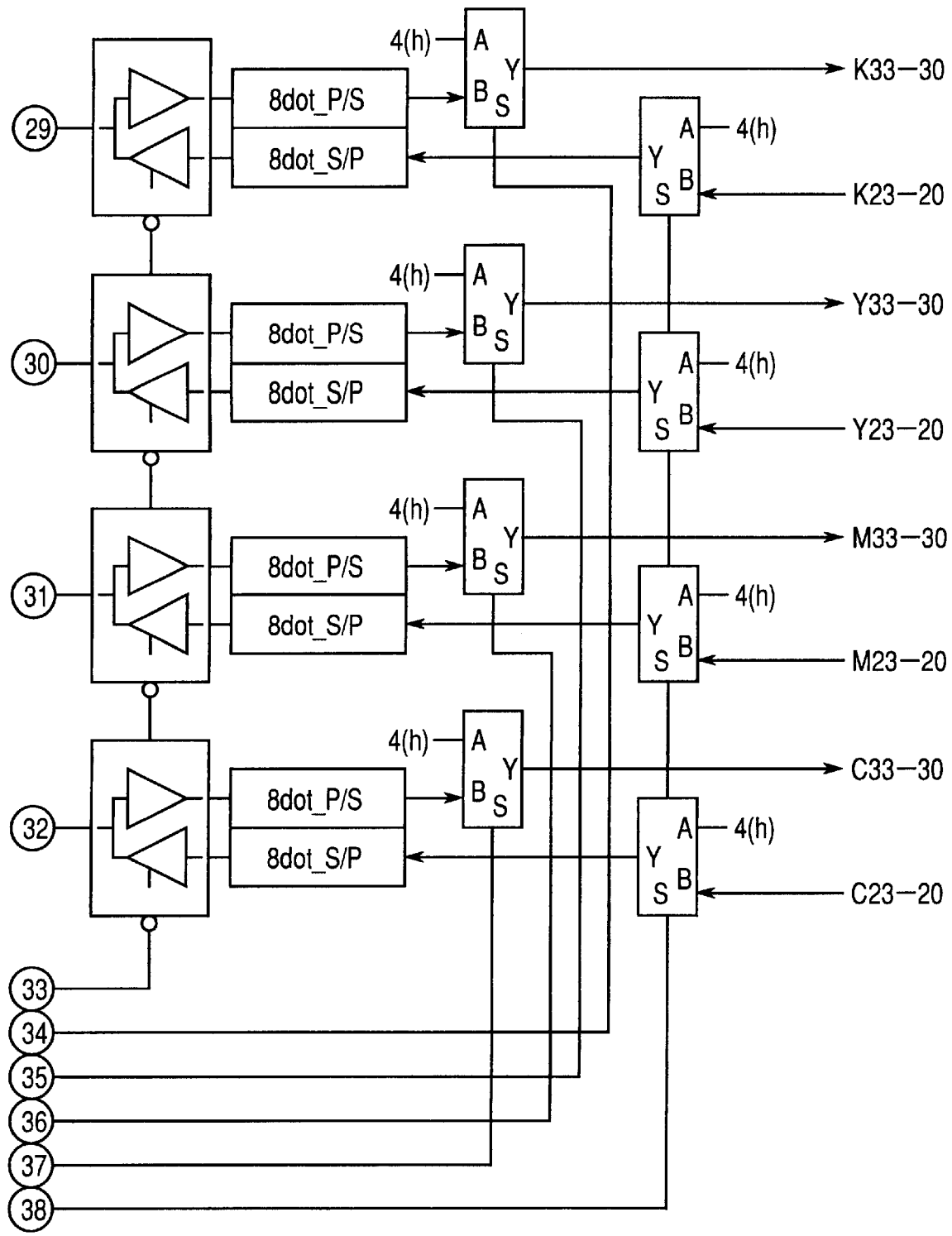

FIGS. 27A and 27B show the frame memory 520. In the double-sided copy operation of the system (for a A4/horizontal paper), an image is formed on five sheets of paper on the transfer belt and along the paper reversal path. A multi-double-sided copy operation is therefore performed by repeating the front-side copy and back-side copy every five sheet. Thus, the image reader needs to temporarily store, in the frame memory, the C, M, Y and K data on the document surface corresponding to the front-side copy. A document surface corresponding to the back-side copy is repeatedly read by the image reader (in the same manner as a normal copy). These functions of the memory and the controller for controlling this memory are performed by the frame memory 520.

In DRAM controller 4401, the main scan address is counted with VLCK (image synchronization clock). The address is cleared by the –TG signal (main scan synchronous signal), and the signals –RAS, –CAS and –WE needed for DRAM control are generated. For the subscan, the address is counted by the TG signal and cleared by –VD signal (subscan enable region signal). At the same time, data writable area signals –C, M, Y, K_WE and data readable area signals –C, M, Y, K_RE are received. The signals WE and –CAS to a DRAM module 4402 are controlled so that they are allowed or inhibited, whereby the write/read can be performed for each region independently of each color. Particularly, the WE signal is enabled at a predetermined timing in the area in which any one of the –C, M, Y, K_WE signals is active ("L"). In this case, in the area in which the –C, M, Y, K_WE signal is active, –C, M, Y, K_CAS signal is allowed to be independently outputted, thereby controlling the write of each color to an optional area of the DRAM module. In the area in which any one of the –C, M, Y, K_RE signals is active, the WE signal is not enabled, and by making –C, M, Y, K_CAS signal active, it is possible to read each color data from the DRAM module in a predetermined area. The signal −RAS is always outputted at a predetermined timing, thus ensuring that the memory device is refreshed. The DRAM module comprises a plurality of DRAMs, and the DRAM module has an area for storing the color data C, M, Y, K on one surface of a A3-size document. The data is written and read in accordance with WE, −CAS and −RAS from the DRAM controller 4401.

The input/output of image data are processed in the same manner as the subscan side of the drawing position controller. That is, for the input, one pack of 8 dots of the main scan is converted from serial to parallel data, to write the 32-bit parallel data. For the output, conversely, the data is converted from parallel to serial data, and the 4-bit serial data is read. For the input, when −WHDWR signal is active ("L"), the data (4-h) for initializing the memory device is used as the input data to the frame memory, thereby erasing the memory device in accordance with the write control. When −WHDWR signal is inactive ("H"), the data C, M, Y and $K_{23-20}$ from the gradation reproducer 500 are used as an input data to the frame memory, thereby each color data is controlled to be written to the memory device. For the output, when −C, M, Y, K CLR signal is "H", a predetermined value (4h) is used as the output data from the frame memory, thereby using the value as transmission data C, M, Y and $K_{33-30}$ to the following step (the drawing position controller). This is performed in the following reason. In an area where the 1-node control in an area (−HD="H" or −VD="H") that is not an enable area on the main scan and subscan sides and the color data readable area signals (C, M, Y, K_RE) are inactive, the image data is cleared and outputted. This memory control is used so as to print the sequential data C, M, Y and K transmitted from an external apparatus. This operation is performed in the following manner. The C, M, Y and K image data is sequentially received and sequentially written to a predetermined frame memory for each color. The four colors are simultaneously read, and a full color print is performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:
   an image forming unit including a plurality of print units each forming an image of one of a plurality of colors based on image data and forming a color image by the plurality of print units;
   an input section which receives the image data and discrimination signals of character edge;
   a detector which detects image distortion of the image;
   a first corrector circuit which corrects the image data received by said input section;
   a second corrector circuit which corrects the discrimination signal of character edge according to the image distortion detected by said detector; and
   a controller which controls said image forming unit to form a color image according to the image data corrected by said first corrector circuit and the discrimination signal of character edge corrected by said second corrector circuit.

2. The image forming apparatus according to claim 1, wherein said input section receives the image data and the discrimination signal of character edge on a plurality of lines, and said second corrector circuit selects one of the discrimination signals of character edge of adjacent two lines according to the image distortion detected by said detector.

3. The image forming apparatus according to claim 2, wherein said first corrector circuit performs interpolation of the image data between the adjacent two lines.

4. The image forming apparatus according to claim 1, wherein said input section receives the image data and the discrimination signal of character edge for each pixel, and second corrector circuit selects one of the discrimination signals of character edge of the adjacent two pixels according to the image distortion detected by said detector.

5. The image forming apparatus according to claim 4, wherein said first corrector circuit performs interpolation of the image data between the adjacent two pixels.

6. The image forming apparatus according to claim 1, further comprising a discriminator circuit which discriminates a character edge from the image data received by said input section to generate the discrimination signal of character edge.

7. The image forming apparatus according to claim 1, wherein said detector comprises a pattern generator which forms images of a predetermined pattern of the plurality of colors, and a sensor which detects the images of the plurality of colors, wherein said detector detects the image distortion according to detection data of the predetermined pattern detected by said sensor.

8. The image forming apparatus according to claim 7, wherein said detector detects a setting error of said sensor according to data of the image of the predetermined pattern of a reference color in the plurality of colors, and said second corrector circuit corrects the discrimination signal of character edge according to the setting error of said detector and the image distortion of the images of the colors other than the reference color relative to the image of the reference color.

9. The image forming apparatus according to claim 1, wherein said first corrector circuit corrects output timing of the image data.

10. The image forming apparatus according to claim 1, wherein said controller selects one of a plurality of gradation reproduction methods used by said image forming unit according to the discrimination signal of character edge.

11. The image forming apparatus according to claim 1, wherein said controller selects one of a plurality of gradation number conversion methods used by said image forming unit according to the discrimination signal of character edge.

12. An image processing apparatus comprising:
    an input section which receives image data of a plurality of colors of a color image and attribute discrimination signals which represent image attributes;
    a detector which detects shifts of images of the plurality of colors;
    a first corrector circuit which corrects the image data to correct the shifts of the images of the colors according to the shifts detected by said detector; and
    a second corrector circuit which corrects the attribute discrimination signals according to the shifts detected by said detector.

13. The image processing apparatus according to claim 12, further comprising a discriminator circuit which discriminates the image attribute from the image data received by said input section to generate the attribute discrimination signal, wherein said input section receives the attribute discrimination signal from said discriminator circuit.

14. The image processing apparatus according to claim 12, wherein the attribute discrimination signal is a discrimination signal of character edge which represents a character edge in the image.

15. The image processing apparatus according to claim wherein said input section receives the image data and the attribute discrimination signals for a plurality of lines, and said second corrector circuit selects one of the attribute discrimination signals of adjacent two lines according to the image distortion detected by said detector.

16. The image forming apparatus according to claim 12, wherein said input section receives the image data and the attribute discrimination signals for a plurality of pixels, and said second corrector circuit selects one of the attribute discrimination signals of adjacent two pixels according to the image distortion detected by said detector.

17. The image forming apparatus according to claim 12, wherein said first corrector circuit performs interpolation of the image data.

18. The image forming apparatus according to claim 12, further comprising a selector which selects one of a plurality of gradation reproduction methods according to the attribute discrimination signals.

19. The image forming apparatus according to claim 12, further comprising a second selector which selects one of a plurality of gradation number conversion methods according to the attribute discrimination signals.

20. A method of forming a color image by print units of a plurality of colors, the method comprising the steps of:

receiving image data and attribute discrimination signals which represent attributes in the image;

detecting image distortion of the color image;

correcting the image data;

correcting the attribute discrimination signals according to the detected image distortion; and controlling image forming by said print units according to the corrected image data and the corrected attribute discrimination signals.

* * * * *